US010387017B2

(12) United States Patent
Lee et al.

(10) Patent No.: US 10,387,017 B2
(45) Date of Patent: Aug. 20, 2019

(54) ELECTRONIC DEVICE FOR DISPLAYING MULTIPLE SCREENS AND CONTROL METHOD THEREFOR

(71) Applicant: Samsung Electronics Co., Ltd., Gyeonggi-do (KR)

(72) Inventors: Jihun Lee, Seoul (KR); Sunhee Moon, Gyeonggi-do (KR); Haemi Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 245 days.

(21) Appl. No.: 15/297,711

(22) Filed: Oct. 19, 2016

(65) Prior Publication Data

US 2017/0131879 A1 May 11, 2017

(30) Foreign Application Priority Data

Nov. 6, 2015 (KR) ........................ 10-2015-0155879

(51) Int. Cl.
*G06F 1/16* (2006.01)
*G06F 3/048* (2013.01)
(Continued)

(52) U.S. Cl.
CPC ........ *G06F 3/04845* (2013.01); *G06F 1/1647* (2013.01); *G06F 1/1652* (2013.01); *G06F 3/0482* (2013.01); *G06F 3/04817* (2013.01); *G06F 3/1423* (2013.01); *G09G 5/38* (2013.01); *G06F 2203/04803* (2013.01);
(Continued)

(58) Field of Classification Search
CPC ...... G06F 3/048; G06F 1/1647; G06F 1/1652; G06F 1/1692
See application file for complete search history.

(56) References Cited

U.S. PATENT DOCUMENTS 6,011,552 A * 1/2000 Ramanathan ......... G06F 3/0481 715/803
2010/0085317 A1* 4/2010 Park ...................... G06F 1/1626 345/173

(Continued)

FOREIGN PATENT DOCUMENTS

| | | |
|---|---|---|
| EP | 2 270 640 | 1/2011 |
| EP | 2 790 096 | 10/2014 |
| KR | 1020110040078 | 4/2011 |

OTHER PUBLICATIONS

International Search Report dated Feb. 6, 2017 issued in counterpart application No. PCT/KR2016/011995, 11 pages.

(Continued)

*Primary Examiner* — Mahelet Shiberou

(74) *Attorney, Agent, or Firm* — The Farrell law Firm, P.C.

(57) ABSTRACT

An electronic device having a plurality of display areas and an operation method therefor are provided. The electronic device includes a first display area; a second display area; and a processor configured to display an application screen including a control object on the first display area, detect an input to move the application screen from the first display area to the second display area, rearrange the control object on the application screen, based on a type of the control object and a movement direction of the application screen, and display the application screen including the rearranged control object on the second display area.

18 Claims, 34 Drawing Sheets

110 115

CANCEL SAVE
Title
All day
Start THU,AUG 20.2015 15:00
End THU,AUG 20.2015 16:00
My calendars
10min before, Notification
MAP 1610 1620

(51) Int. Cl.

| | |
|---|---|
| ***G06F 3/0484*** | (2013.01) |
| ***G06F 3/0481*** | (2013.01) |
| ***G06F 3/0482*** | (2013.01) |
| ***G06F 3/14*** | (2006.01) |
| ***G09G 5/38*** | (2006.01) |
| *G09G 5/14* | (2006.01) |

(52) U.S. Cl.
CPC ....... *G09G 5/14* (2013.01); *G09G 2340/0464* (2013.01); *G09G 2380/02* (2013.01)

(56) References Cited

U.S. PATENT DOCUMENTS

2010/0306650 A1* 12/2010 Oh ........................ G06F 3/0482 715/702
2012/0005578 A1* 1/2012 Hawkins ............... G06F 3/0488 715/702
2012/0026069 A1 2/2012 Ohsaki
2012/0110497 A1 5/2012 Gimpl et al.
2012/0225694 A1 9/2012 Sirpal et al.
2012/0299845 A1* 11/2012 Seo ....................... G06F 1/1641 345/173
2013/0019192 A1 1/2013 Itoh et al.
2013/0120464 A1 5/2013 Wei et al.
2013/0212535 A1* 8/2013 Kim ...................... G06F 3/0482 715/841
2014/0101581 A1* 4/2014 Lan ....................... G06F 3/0488 715/765
2014/0223343 A1 8/2014 Lee et al.
2014/0359473 A1 12/2014 Tang
2015/0040027 A1 2/2015 Cheng et al.
2015/0121306 A1* 4/2015 Fundament ........... G06F 3/0482 715/811
2015/0149941 A1 5/2015 Itagaki et al.

OTHER PUBLICATIONS

European Search Report dated Oct. 8, 2018 issued in counterpart application No. 16862330.4-1221, 11 pages.

* cited by examiner

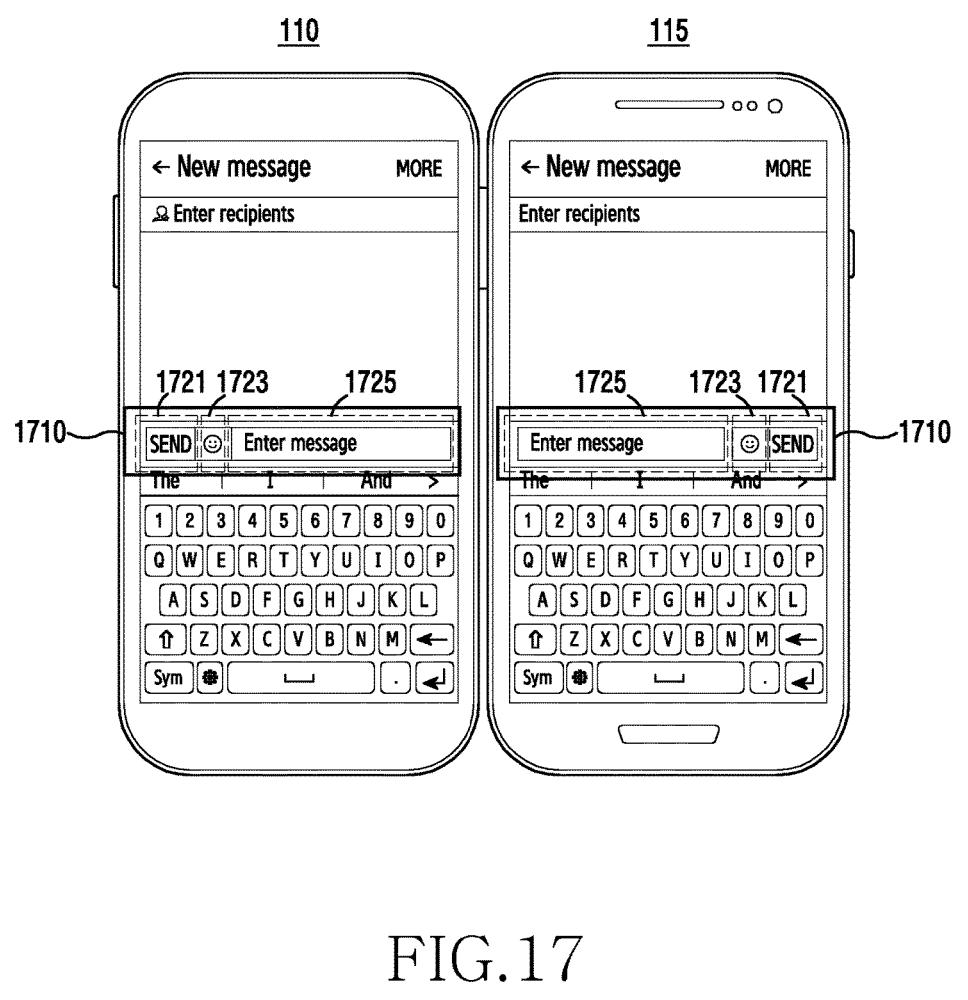

110

115

← New message MORE

Enter recipients 1721 1723 1725

1710

SEND ☺ Enter message

The I And >

1 2 3 4 5 6 7 8 9 0

Q W E R T Y U I O P

A S D F G H J K L

Z X C V B N M

Sym .

FIG. 17

ELECTRONIC DEVICE FOR DISPLAYING MULTIPLE SCREENS AND CONTROL METHOD THEREFOR

PRIORITY

This application claims priority under 35 U.S.C. § 119(a) to Korean Application Serial No. 10-2015-0155879, which was filed in the Korean Intellectual Property Office on Nov. 6, 2015, the entire content of which is incorporated herein by reference.

BACKGROUND

1. Field of the Disclosure

The present disclosure relates generally to multiple screen displays, and more particularly, to an electronic device and method for displaying multiple screens.

2. Description of the Related Art

An electronic device may include a plurality of displays and display a screen on each of the displays. In addition, the electronic device may set a plurality of screen areas on a single display and display a screen on each of the set display areas.

When the electronic device displays a screen including a control object, e.g., an icon or button, the position of the control object within the screen is fixed, regardless of the position of the screen being displayed. The fixed position of the control object may create an inconvenience for a user to select the control object.

For example, in an electronic device including two display areas, i.e., a left display area and a right display area, when a screen including a control object is displayed on the right display area is moved to the left display area, the accessibility of the control object within the screen can be degraded, e.g., because it is not easily reached by the user's finger.

SUMMARY

The present disclosure is designed to address at least the problems and/or disadvantages described above and to provide at least the advantages described below.

Accordingly, an aspect of the present disclosure is to provide an electronic device and method for displaying a plurality of screens and rearranging a display screen in consideration of morphological characteristics of the displayed screen, when the screen is moved.

Another aspect of the present disclosure is to provide an electronic device and method for rearranging a position of a control object based on a display position of a screen.

Another aspect of the present disclosure is to provide an electronic device and method for rearranging a control object to fit into a screen for movement, when the screen moves between a plurality of displays.

In accordance with an aspect of the present disclosure, an electronic device is provided, which includes a first display area; a second display area; and a processor configured to display an application screen including a control object on the first display area, detect an input to move the application screen from the first display area to the second display area, rearrange the control object on the application screen, based on a type of the control object and a movement direction of the application screen, and display the application screen including the rearranged control object on the second display area.

In accordance with another aspect of the present disclosure, a method is provided for displaying a screen of an electronic device. The method includes displaying an application screen including a control object on a first display area; detecting an input to move the application screen from the first display area to a second display area; rearranging the control object on the application screen, based on a type of the control object and a movement direction of the application screen; and displaying the application screen including the rearranged control object on the second display area.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 17 illustrates rearranging an inverting element on a moved screen according to an embodiment of the present disclosure;

DETAILED DESCRIPTION

Figure 1:
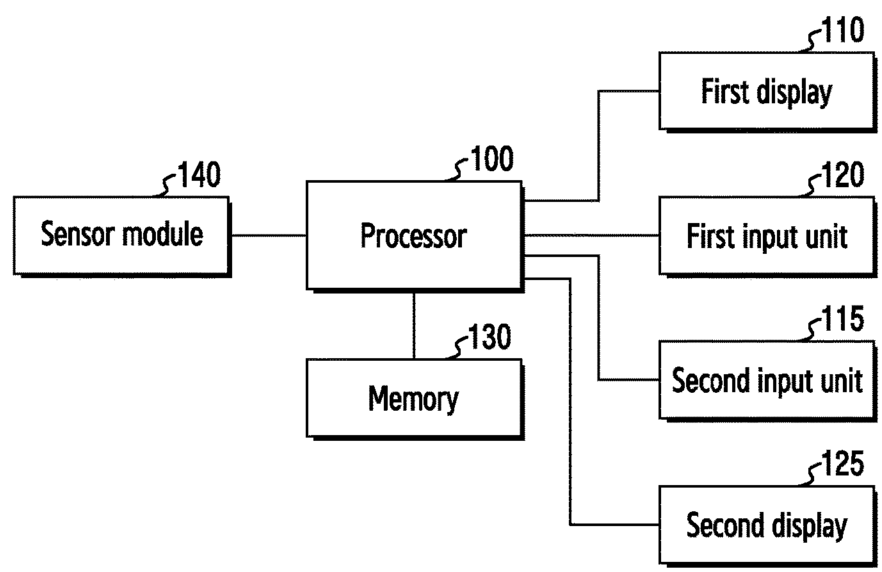
FIG. 1 illustrates an electronic device according to an embodiment of the present disclosure.

Hereinafter, various embodiments of the present disclosure will be described in detail below with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure.

In describing the drawings, similar reference numerals may be used to designate similar elements.

The terms used in the present disclosure are used to describe specific embodiments, and are not intended to limit the present disclosure.

As used herein, singular forms may include plural forms as well, unless the context clearly indicates otherwise.

Unless defined otherwise, all terms used herein, including technical and scientific terms, have meanings as those commonly understood by a person skilled in the art to which the present disclosure pertains. Such terms as those defined in a commonly used dictionary may be interpreted to have the same meanings as the contextual meanings in the relevant field of art, and are not to be interpreted to have ideal or excessively formal meanings unless clearly defined as such herein.

In some cases, even terms defined in the present disclosure should not be interpreted to exclude embodiments of the present disclosure.

An electronic device according to an embodiment of the present disclosure may include a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. For example, the wearable device may include an accessory type device (e.g., a watch, a ring, a bracelet, an anklet, a necklace, a glasses, a contact lens, or a Head-Mounted Device (HMD)), a fabric or clothing integrated type device (e.g., electronic clothing), a body-mounted type device (e.g., a skin pad or tattoo), and a bio-implantable type device (e.g., an implantable circuit).

Hereinafter, various embodiments of the present disclosure will be described based on an approach of hardware. However, various embodiments of the present disclosure include a technology that uses both hardware and software, and thus, the various embodiments of the present disclosure may not exclude the perspective of software.

Herein, the term "control object" may represent a user interface (UI) of icons, buttons, etc., which can generate various inputs for performing a function of a corresponding application, information movement, selection of information, switching of a screen, changing of an execution mode, searching, etc., in a screen that is displayed as a graphical UI (GUI) environment. For example, a check box may be a kind of a control object having a small square icon that may be used to select, by a user, one or more desired items from among multiple items in the GUI environment.

The control object may be classified as a general control object, a control object of a horizontal control object group, a control object of a vertical control object group, or a control object of complex control object group.

A general control object may control a corresponding item or an overall operation of the screen. The general control object may be formed by a set of a single object or a plurality of objects for controlling each function.

A horizontal control object group includes a plurality of control objects that are horizontally arranged on a single area, which can be moved in a horizontal control object group area size, when the screen moves. An order of the control objects can be inverted and arranged in reverse order in a control object group area.

A vertical control object group includes a plurality of control objects that are vertically arranged on a single area, which can be moved in a vertical control object group area size, when the screen moves. An order of the control objects may remain the same in the control object group area.

A complex control object group includes a control object displayed in a fixed position and a control object that may change position, when the screen moves. For example, when the screen moves, the electronic device may determine whether the fixed control object is included therein, and when the fixed control object is included, the electronic device may arrange the fixed control object in a corresponding fixed area and then rearrange any movable objects in a corresponding position according to the type of the control objects (for example e.g., general control object, horizontal control object group, and/or vertical control object group).

In addition, the control objects may be classified by type such as a floating element, a pushing element to one side, a swapping element, a sending element to the far side, or a reversing order of element.

The floating element and sending element (sending element to the far side) may have characteristics similar to the general control objects, the pushing element (pushing element to one side) may have characteristics similar to a complex control object, the swapping element may have characteristics similar to the vertical control object group, and the inverting element (inverting order of element) may have characteristics similar to the horizontal control object group.

Herein, the term "screen" may refer to information that is displayed on a display, and the displayed information may include images, text, UI, and/or control objects.

The phrase "reversal of position" or "reversed position" may refer to an operation for converting the horizontal position and/or vertical position of the object on the screen that is displayed on the display. For example, when the control object is being displayed at a position (an inner side of the display), which is 100 pixels away from the left side of the display (for example, the boundary of a left bezel of the electronic device and the display), the reversal of the horizontal position may be a horizontal position which is 100 pixels away from the right side of the display (for example, the boundary of a right bezel of the electronic device and the display).

An electronic device according to an embodiment of the present disclosure may include a plurality of displays or set a plurality of display areas on the display. In addition, when the screen is moved between displays (or between display areas), the electronic device may rearrange a control object or a controller object that controls a main task within the screen, according to the moved screen position. For example, when an application screen moves from a display (or display area) on the right side to a display (or display area) on the left side, the electronic device may rearrange a control object, which was originally on the right side of the application screen, to the left side of the application screen in order to easily handle a task of application by a left hand. Therefore, the electronic device may provide access to the control object on the left side of the moved screen, in the same manner as when originally displayed on the right side of the screen before being moved.

FIG. 1 illustrates an electronic device according to an embodiment of the present disclosure. Specifically, the electronic device of FIG. 1 includes two displays and can rearrange control objects in a screen that is moved between the two displays.

Referring to FIG. 1, the electronic device includes a processor 100, a first display 110, a second display 115, a first input unit 120, a second input unit 125, a memory 130, and a sensor module 140. Alternatively, the electronic device may omit at least one of the elements and/or additionally include other elements.

The processor 100 may include one or more of a central processing unit (CPU), an application processor (AP), and a communication processor (CP). The processor 100 may perform control of at least one other element of the electronic device and/or an operation or data processing according to the execution of an application.

The electronic device may include a plurality of displays. For example, the electronic device may include a dual display formed by a first display 110 and a second display 115. The first display 110 and second display 115 may include a liquid crystal display (LCD), light-emitting diode (LED) display, an organic LED (OLED) display, a microelectro-mechanical systems (MEMS) display, and/or an electronic paper display. The first display 110 and second display 115 may display various screens to a user (e.g., text, image, video, icon, or symbol, and so on). The screen may include control objects, which may be classified as a general control object, a control object of a horizontal control object group, a control object of a vertical control object group, or a control object of a complex control object.

The first input unit 120 and second input unit 125 may include at least one of touch panel, (digital) pen sensor, key, and ultrasonic input units.

The touch panel may use at least one of capacitive, resistive, infrared, and ultrasonic methods. In addition, the touch panel may further include a control circuit. The touch panel may further include a tactile layer to provide a tactile reaction to the user.

The (digital) pen sensor may be a part of the touch panel, or may include a separate recognition sheet.

The key may include a physical button, an optical key, and/or keypad.

The ultrasonic input unit may detect an ultrasonic wave generated by the input unit and check data corresponding to the detected ultrasonic wave.

The first display 110 and first input unit 120, and the second display 115 and second input unit 125 may configure an integrated touch screen, respectively. The touch screen may display a screen under the control of the processor 100 and detect a gesture, proximity, and/or hovering input by using an electronic pen or a part of the user's body.

The memory 130 may include a volatile memory and/or a non-volatile memory. The memory 130 may store a related command or data in at least one other element of the electronic device. The memory 130 may store software and/or program. The program may include a kernel, middleware, application programming interface (API) and/or application program (or "application"). At least a part of the kernel, middleware, or API may be referred to as an operating system (OS).

The sensor module 140 may measure a physical quantity or sense an operation state of the electronic device and convert the measured or sensed information into an electric signal. The sensor module 140 may include at least one of a gesture sensor, a gyro sensor, a barometer, a magnetic sensor, an acceleration sensor, a grip sensor, a proximity sensor, a color sensor (e.g., RGB (red, green, blue) sensor), a medical sensor, a temperature-humidity sensor, an illuminance sensor, a ultra violet (UV) sensor, or a flexibility detection sensor for detecting the bending of the electronic device.

Additionally or alternatively, the sensor module 140 may further include a control circuit for controlling one or more sensors included therein. The electronic device may further include a processor configured to control the sensor module 140, as a part of or separate from the processor 100, and may control the sensor module 140 while the processor 100 is in a sleep state. The sensor module 140 may include a sensor for detecting the flexing of the electronic device, when the first display 110 and/or the second display 115 are flexible displays.

The electronic device may further include a communication module, a camera module, etc. The communication module may include a cellular communication module and/or a short range communication module. The cellular communication may use at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), etc. The cellular communication may include at least one of Wi-Fi, Bluetooth, Near Field Communication (NFC), or Global Navigation Satellite System (GNSS), or a Global Positioning System (GPS).

Figure 2:
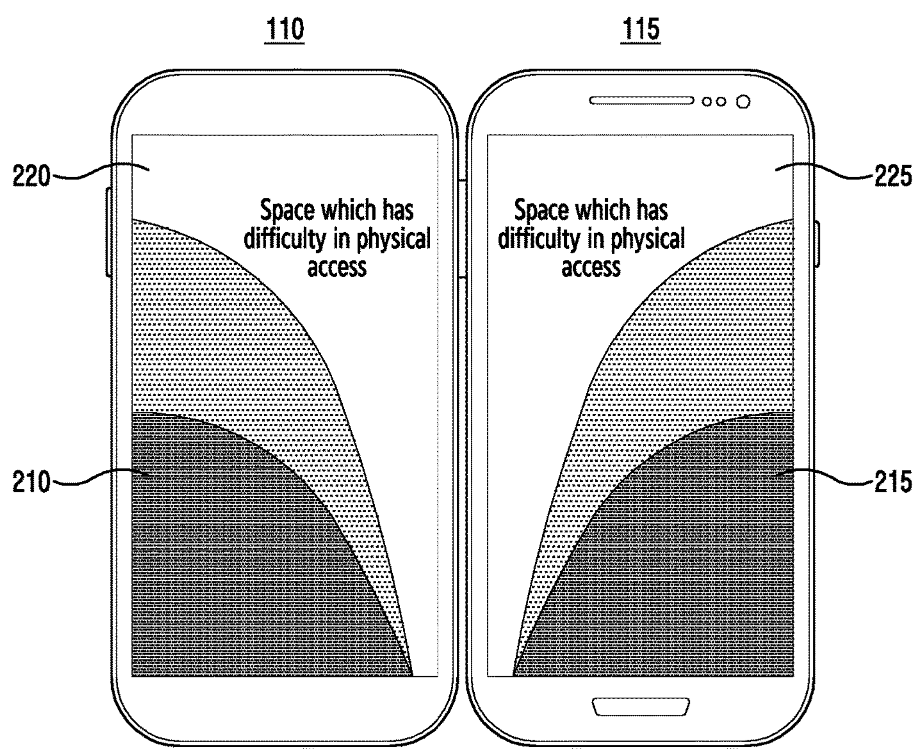
FIG. 2 illustrates user accessibility to a display in an electronic device including a dual display according to an embodiment of the present disclosure.

FIG. 2 illustrates a user's accessibility to a display in an electronic device including a dual display according to an embodiment of the present disclosure.

Referring to FIG. 2, the first display 110 displays a left screen, and the second display 115 displays a right screen. When the user uses the electronic device with two hands, the first display 110 is generally held by a left hand and the second display 115 is generally held by a right hand. An area indicated by reference numeral 210 on the first display may be easily reached using the left hand, e.g., the thumb of the left hand, and an area indicated by reference numeral 220 may be difficult to access with the left hand.

Similarly, on the second display 115, an area indicated by reference numeral 215 may be easily reached using the right hand, e.g., the thumb of the right hand, and an area indicated by reference numeral 225 may be difficult to access with the right hand.

Therefore, when a screen is displayed on the first display 110 or the second display 115, the user's accessibility to a control object in the displayed screen may be improved by placing the control object in area 210 or area 215.

Figure 3A:
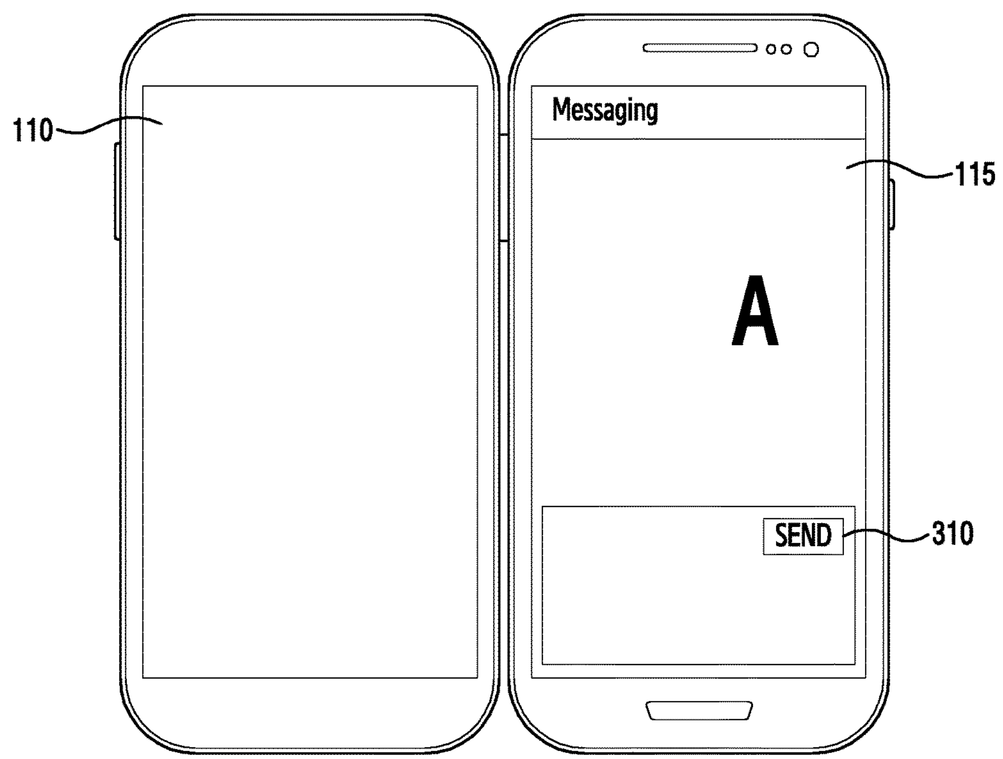
FIGS. 3A and 3B illustrate rearranging a control object in an electronic device including a dual display according to an embodiment of the present disclosure.
Figure 3B:
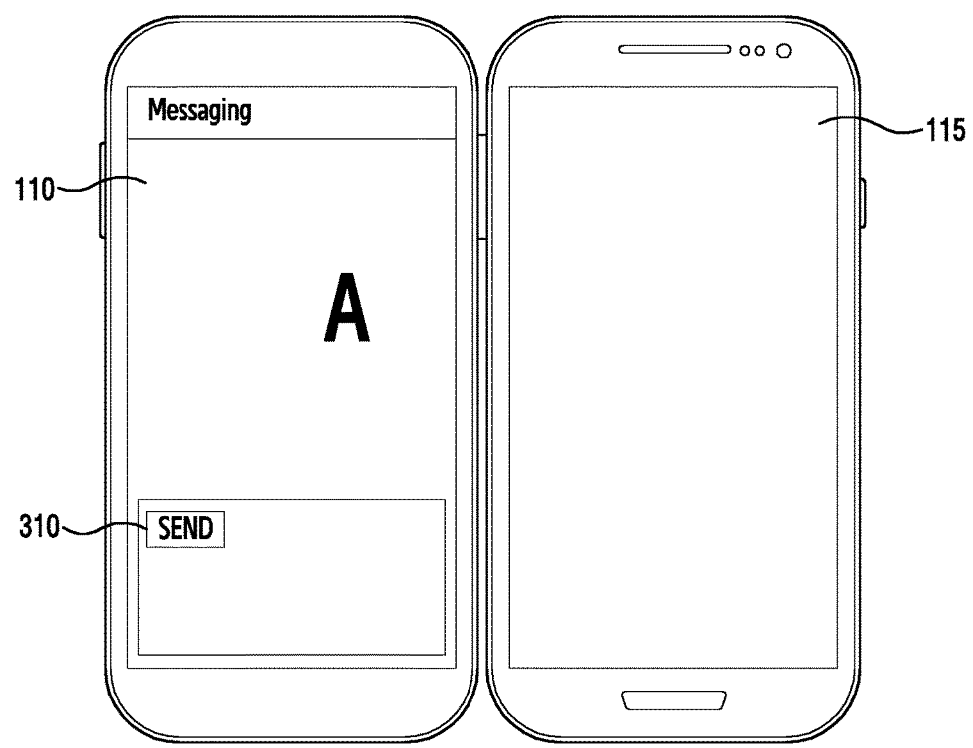

FIGS. 3A and 3B illustrate rearranging control objects in an electronic device including a dual display according to an embodiment of the present disclosure.

Referring to FIG. 3A, the electronic device displays a screen including a control object 310 on the lower right side thereof, in the second display 115, based on the user's right hand use.

Referring to FIG. 3B, when the screen is moved to and displayed in the first display 110, the control object 310 is moved to a lower left side of the screen, based on the user's left hand use.

Accordingly, instead of fixing the control object 310 in area of the screen that may be difficult to access by the user (e.g., area 225 or 220 in FIG. 2), when the screen is moved, the electronic device moves the control object 310 to be displayed in area of the first display 110 or the second display 115, which is easily reached by the user (e.g., area 210 or 215 in FIG. 2).

Figure 4:
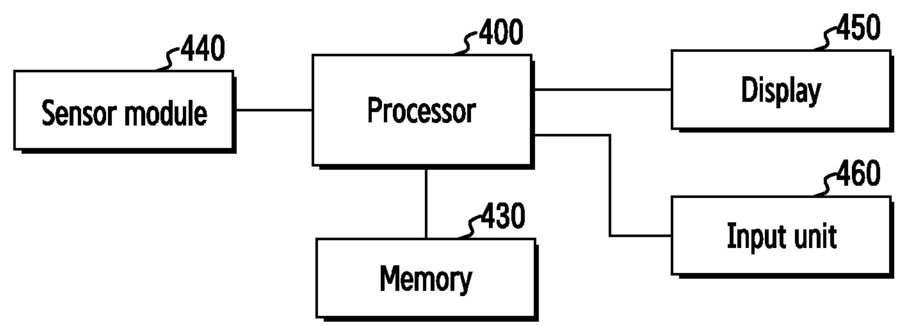
FIG. 4 illustrates an electronic device according to an embodiment of the present disclosure.

FIG. 4 illustrates an electronic device according to an embodiment of the present disclosure. Specifically, the electronic device of FIG. 4 may set a plurality of display areas in a display, and may rearrange control objects in a screen, when the screen moves between the display areas.

Referring to FIG. 4, the electronic device includes a processor 400, a display 450, an input unit 460, a memory 430, and a sensor module 440. In some embodiments, the electronic device may omit at least one of the elements or additionally include other element. The configuration and operation of the processor 400, the display 450, the input unit 460, the memory 430, and the sensor module 440 of the FIG. 4 may be the same as or similar to the processor 100, the first display 110, the first input unit 120, the memory 130, and the sensor module 140 of the electronic device of FIG. 1.

Alternatively, the electronic device may omit at least one of the elements and/or additionally include other elements.

The processor 400 may set a plurality of display areas in the display 450, and may move a screen between the display areas. For example, the processor 400 may divide a display area of the display 150 into a left side display area and a right side display area, and may move the screen that is displayed on the right side display area (or the left side display area) to the left side display area (or the right side display area) and then display the same. When the screen moves between display areas of the display 450, the processor 400 may rearrange a control object included in the screen to be displayed in area that is easily accessed by the user.

Figure 5A:
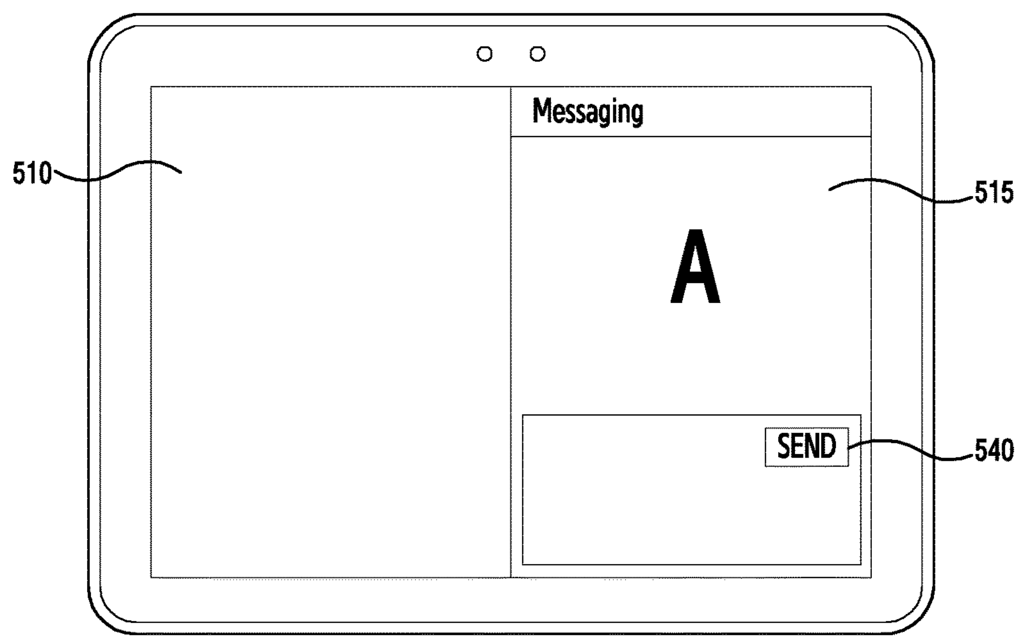
FIGS. 5A and 5B illustrate setting a dual-display area on a display in an electronic device and rearranging a control object, when a screen moves between display areas according to an embodiment of the present disclosure.
Figure 5B:
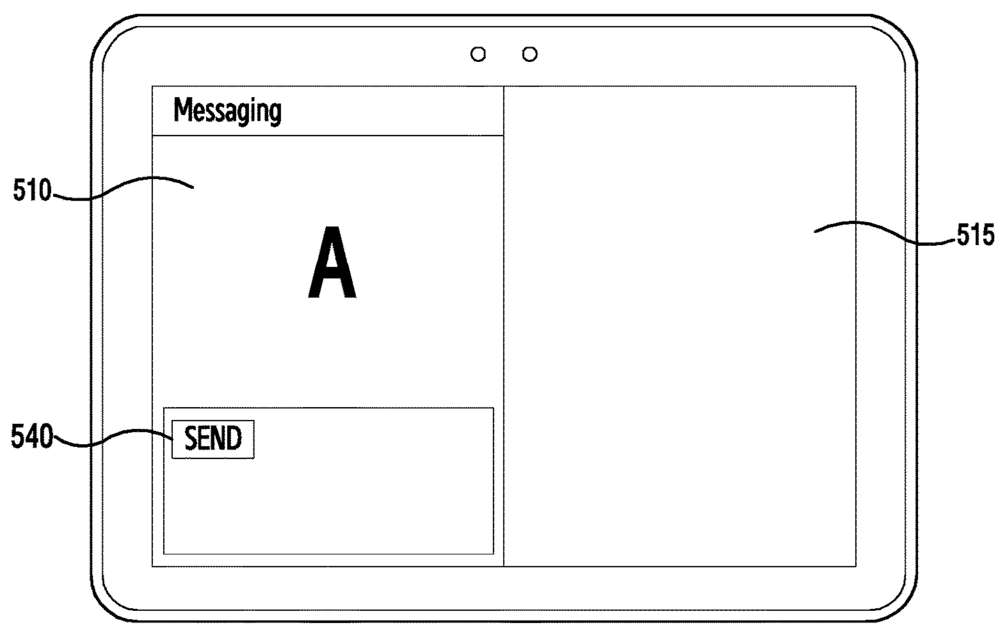

FIGS. 5A and 5B illustrate rearranging a control object of a screen, when the screen is moved between two display areas, according to an embodiment of the present disclosure.

Referring to FIG. 5A, a first display area 510 and a second display area 515 are set in the display. A screen including a control object 540 is displayed on the second display area 515. Similar to FIG. 3A, the control object 540 is displayed on the lower right side of the screen, based on the user's right hand use.

Referring to FIG. 5B, when the screen is moved to and displayed in the first display area 510, the control object 540 is moved to a lower left side of the screen, based on the user's left hand use.

Accordingly, instead of fixing the control object 540 in area of the screen that may be difficult to access by the user, when the screen is moved, the electronic device moves the control object 540 to be displayed in an area of the first display area 510 or an area of the second display area 515, which is easily reached by the user.

Figure 6A:
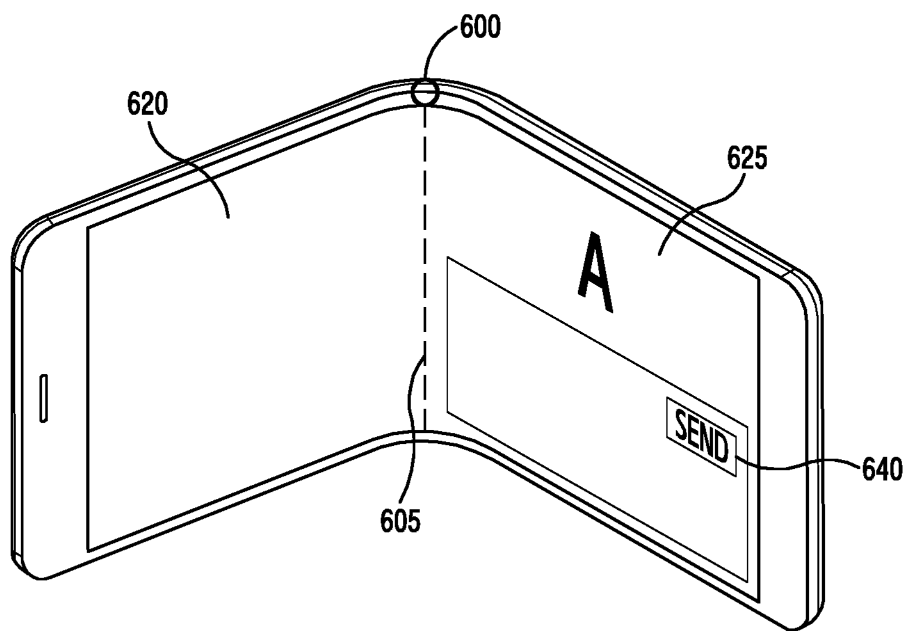
FIGS. 6A and 6B illustrate rearranging a control object in an electronic device including a flexible display, when a screen moves between display areas, according to an embodiment of the present disclosure.
Figure 6B:
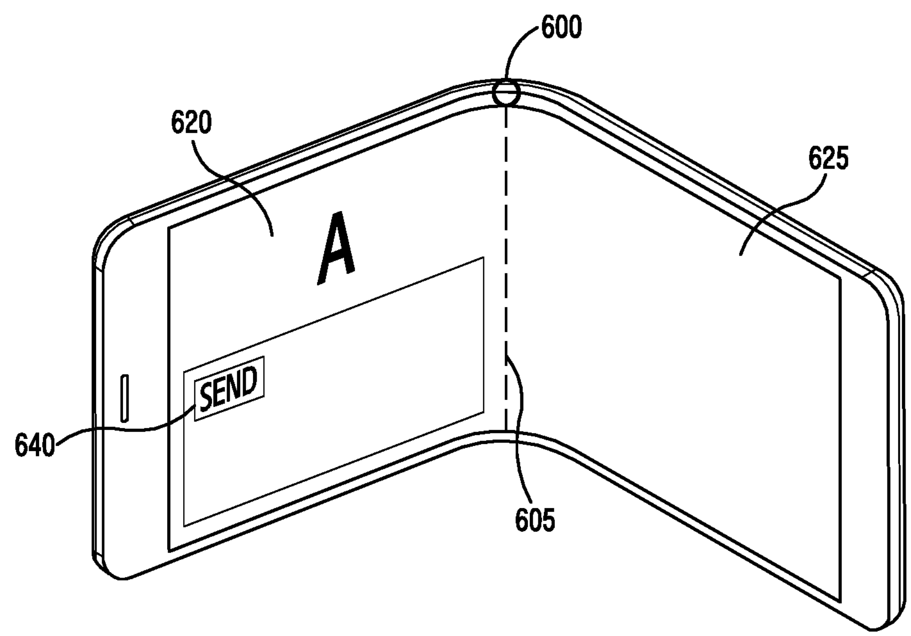

FIGS. 6A and 6B illustrate rearranging a control object on a screen of an electronic device including a flexible display, when the screen is moved between different display areas, according to an embodiment of the present disclosure.

In the electronic device illustrated in FIG. 4, the display 450 may be a flexible display, and the sensor module 440 may detect the bending of the flexible display 450. The electronic device having the flexible display 450 may include a main board and electronic components mounted on the main board. The main board of the electronic device may be configured as an articulated structure, and may be arranged so as to pass through a foldable device (e.g., a hinge). That is, the electronic device may be configured to allow the foldable device to be placed in a folded position.

Referring to FIG. 6A, the sensor module 440 includes a sensor 600 that detects the bending of the flexible display 450, which may be installed in the foldable device or at a position adjacent to the foldable device.

The processor 400 may detect whether the flexible display 450 is bent by using the sensor 600. In addition, when the processor recognizes that the display 450 is bent, as illustrated in FIGS. 6A and 6B, a flexed portion of the display 450 can be set as a boundary 605, which divides the display 450 into two areas that the processor 400 may set as a first display area 620 and a second display area 625.

Referring to FIG. 6A, the first display area 620 and the second display area 625 are set in the display on sides of the boundary 605 formed by the bending of the device. A screen including a control object 640 is displayed on the second display area 625. Similar to FIGS. 3A and 5A, the control object 640 is displayed on the lower right side of the screen, based on the user's right hand use.

Referring to FIG. 6B, when the screen is moved to and displayed in the first display area 6200, the control object 640 is moved to a lower left side of the screen, based on the user's left hand use.

Accordingly, instead of fixing the control object 640 in area of the screen that may be difficult to access by the user, when the screen is moved, the electronic device moves the control object 640 to be displayed in an area of the first display area 620 or an area of the second display area 625, which is easily reached by the user.

As described above, an electronic device according to an embodiment of the present disclosure may display a screen on a plurality of display areas, and may rearrange positions of control objects included in the screen, when the screen moves between the display areas. A control object may be rearranged to a position at which a user's accessibility can be improved.

As described above, the plurality of display areas may be set by using a plurality of displays, a plurality of display areas on a display, or by setting the display areas around a boundary set by bending of an electronic device including a flexible display.

Herein, it is assumed that the electronic device is provided with a dual-display and a dual-screen which is displayed using the dual display corresponds to the left screen and right screen. In the dual display, it is assumed that the first display is a display for displaying the left screen and the second display is a display for displaying the right screen.

In accordance with an embodiment of the present disclosure, an electronic device including a dual display may improve a user's accessibility by rearranging a control object on a screen when moved, based on an area in which the screen is ultimately displayed. For example, when moving a screen from right to left, the control object can be rearranged to a left area of the screen in order for the user to handle the control object by a left hand. Conversely, when moving the screen from left to right, the control object can be rearranged to the right area of the screen in order for the user to handle the control object by a right hand.

The electronic device according to various embodiments of the present disclosure may include a display having a first display area and a second display area; and a processor configured to, when a screen including the control object moves between the display areas, analyze a type of the control object, rearrange the control object based on the display area in the movement direction, and display, on a display area for movement, the screen on which the control object is rearranged.

In addition, the first display area of the display is an area located on the left hand side, and the second display area of the display may be an area located on the right hand side. In addition, the display may be a dual display device including a first display for the first display area and a second display area for the second display area.

In addition, when the control object included in the screen is a general control object, the processor may rearrange the control object on a display area for movement such that the horizontal position of the control object is reversed and the vertical position thereof remains the same. Here, the general control object may be a control object of a floating element which is displayed on a layer different from the screen display layer. In addition, the general control object may also be displayed on the same layer as the screen, and the processor may reverse the horizontal positions of the general control object so as to rearrange the same on the left side of the left screen or the right side of the right screen.

In addition, when the control object displayed on the screen is a horizontal control object group in which a plurality of control objects are horizontally connected to each other, the processor may rearrange the control objects in a display area for movement such that the order of the control objects in the horizontal group area is inverted and the vertical position thereof remains the same.

In addition, when the control object displayed on the screen is a vertical control object group in which a plurality of control objects are vertically connected to each other, the processor may rearrange the control objects in a display area for movement such that the horizontal position of the vertical control object group is reversed and the vertical position thereof remains the same. When the vertical control object group is rearranged, the processor may rearrange display information and control objects that configure the screen and rearrange the same.

In addition, when the control object displayed on the screen is a complex control object including a fixed control object and the rearranged control object, the processor may arrange the fixed control object in a fixed position in a display area for movement, and rearrange the rearranged control object in a position opposite to the direction of a display area for movement.

Figure 7:
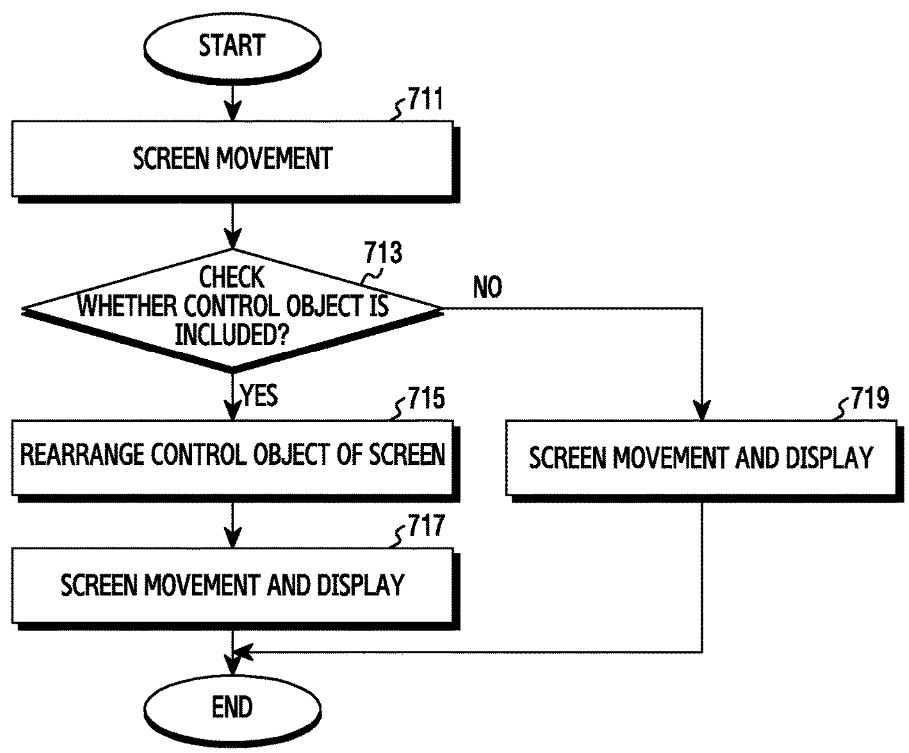
FIG. 7 is a flowchart illustrating a procedure for moving a screen in an electronic device according to an embodiment of the present disclosure.

FIG. 7 is a flowchart illustrating a procedure for moving a screen in an electronic device according to an embodiment of the present disclosure.

Referring to FIG. 7, the processor 100 may display, on the first display 110 and/or the second display 115, a screen of an application that is being executed. In addition, when a screen movement request is generated in a state where the screen is displayed, the processor 100 may move the screen being displayed to another display and display the same thereon. For example, the screen movement request may be performed by configured interaction (e.g., touch and drag, and multi-touch swipe, hovering, etc.). For example, when the movement request for the screen displayed on the first display 110 is generated, the processor 100 may recognize the request through the first input unit 120. In addition, when the movement request for the screen displayed on the second display 115 is generated, the processor 100 may recognize the request through the second input unit 125.

Referring to FIG. 7, in step 711, the electronic device detects movement of a screen displayed in a first display area to a second display area.

In step 713, the electronic device determines if a control object is included in the screen being moved.

When there is no control object included in the screen, the electronic device displays the moved screen in the second display area in step 719.

However, when the control object is included in the screen, the electronic device is rearranges a position of the control object within the screen, based on the movement of the screen to the second display area in step 715. In accordance with an embodiment of the present disclosure, the movement direction of the screen may move from the left screen to the right screen or move from the right screen to the left screen, and the like. In accordance with an embodiment of the present disclosure, the type of the control object may be a general control object, a horizontal control object group, a vertical control object group, and the like. The electronic device may also determine the position of the control object within the screen according to a type of the control object, as will be described in more detail below.

In step 717, the electronic device displays the screen including the rearranged control object in the second display area.

Figure 8A:
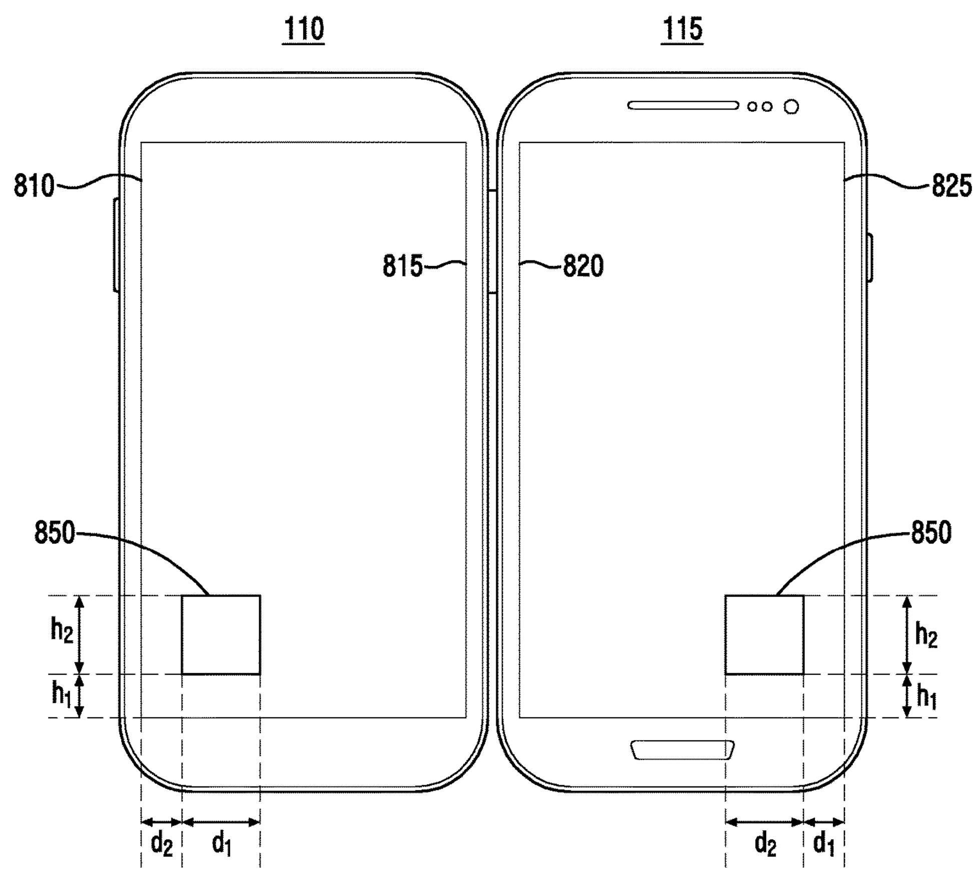
FIGS. 8A, 8B and 8C illustrate rearranging a first type of control object on a moved screen according to an embodiment of the present disclosure.
Figure 8B:
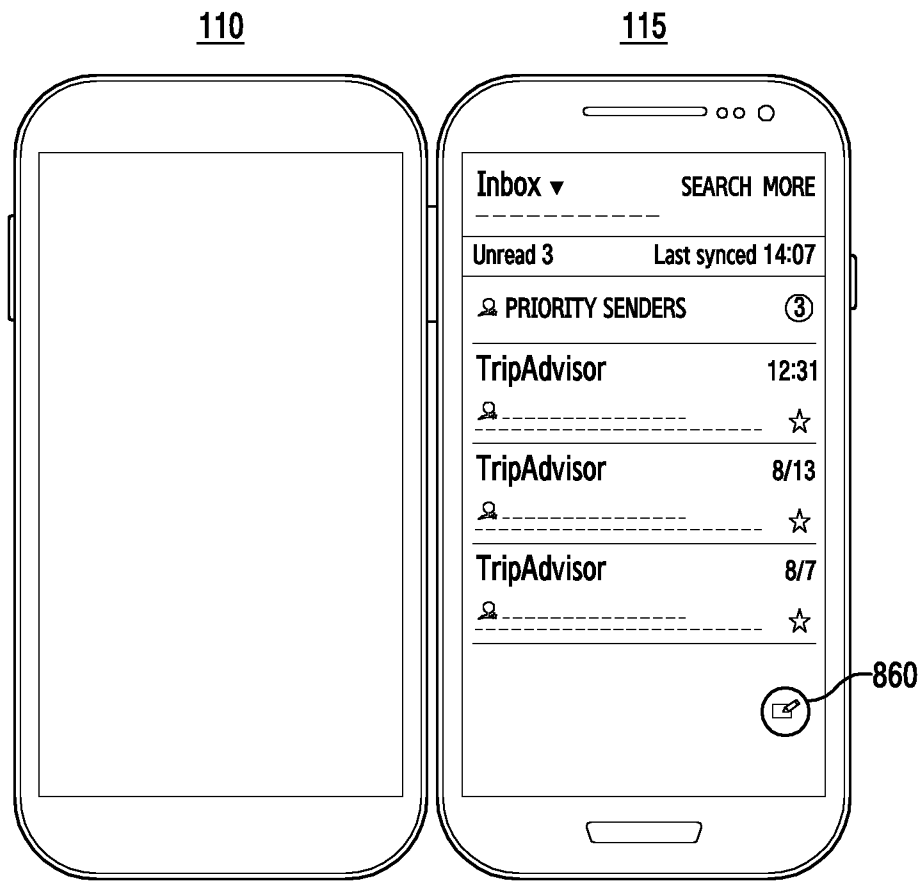
Figure 8C:
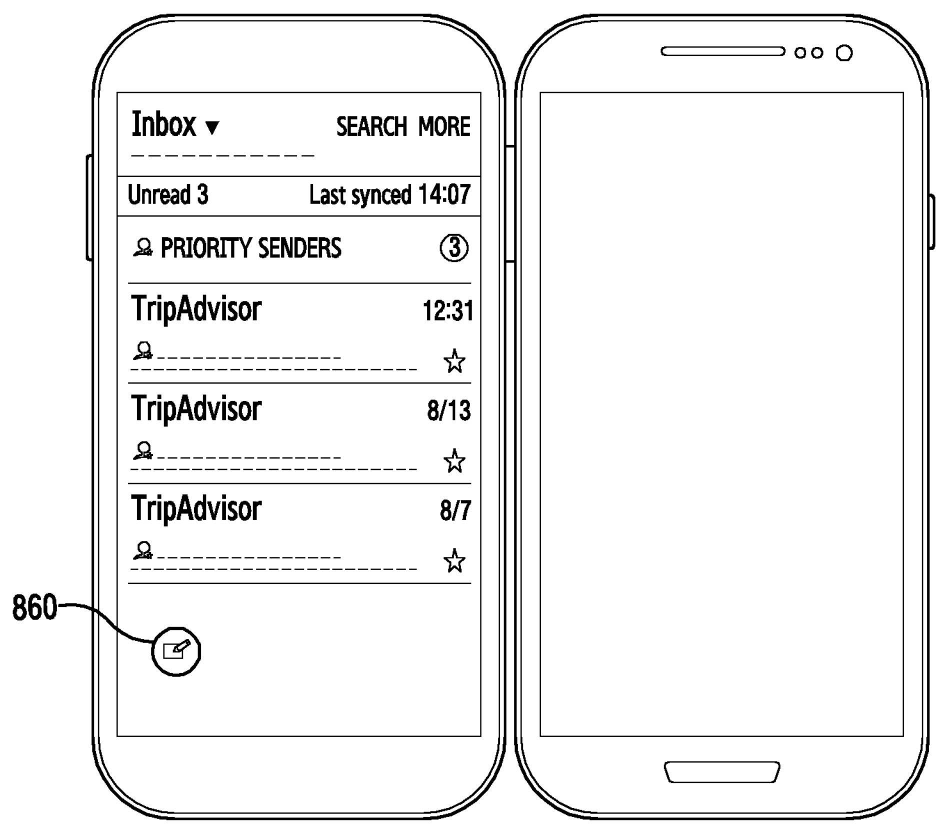

FIGS. 8A, 8B, and 8C illustrate rearranging a first type of control object on a moved screen according to an embodiment of the present disclosure. Specifically, FIGS. 8A, 8B, and 8C illustrate rearranging a general control object. The general control object may be a single control object or a control object in which similar functions are combined as a set. The general control object may control a single item, or a specific function of the full screen.

Referring to FIG. 8A, a screen displayed on the first display 110 includes a general control object 850. The general control object 850 displayed on the first display 110 has a width d1 and is separated in the horizontal direction from a first boundary surface 810 by a distance d2. The general control object 850 displayed on the first display 110 also has a height h2, and is separated in the vertical direction from a lower boundary surface by a distance h1.

When the screen displayed on the first display 110 is moved to and displayed on the second display 115, the processor 100 rearranges the control object 850 by reversing the horizontal position thereof, while the vertical position remains the same. That is, when the screen is moved to the second display 115, the control object 850 still has a width d2, but is separated in the horizontal direction from a second boundary surface 825 by a distance d1. Further, the control object 850 still has a height h2, and is still separated in the vertical direction from the lower boundary surface by the distance h1. Accordingly, when the screen is moved, the processor 100 rearranges the general control object by reversing the position of the general control object in the horizontal direction. Herein, when the horizontal position of the general control object is determined, a horizontal reversal may refer to rearranging the distance such that the distance from the first boundary surface (or the second boundary surface) of the first display 110 and the distance from the second boundary surface (or the first boundary surface) of the second display 115 are the same as or similar to each other. For example, the reversed horizontal position may be the left (or right) side position of the left screen and the right (or left) side position of the right screen in the horizontal direction. In addition, the boundary surface may be a boundary of the displays 110 and 115 and a bezel.

As described above, the electronic device according to various embodiments of the present disclosure may rearrange, a general control object included in a screen, such that the position of the general control object is reversed horizontally while remaining the same vertically.

Referring to FIGS. 8B and 8C, examples of screens of an e-mail application are provided. Specifically, FIG. 8B illustrates a right e-mail application screen that is displayed on the second display 115, and FIG. 8C illustrates a left e-mail application screen that is displayed on the first display 110. In the right and left e-mail application screens, a create button is provided as a general control object 860. For example, the create button may be a general control object for executing a write function in the e-mail application.

In FIG. 8B, the control object 860 is located in the lower right of the second display 115, suitable for access by a user's right hand. When the screen is moved to the first display 110, as illustrated in FIG. 8C, the position of the control object 860 is rearranged to the lower left of the first display 110, suitable for access by a user's left hand.

In FIGS. 8B and 8C, the general control object 860 is rearranged such that the general control object remains the same in the vertical direction but is reversed in the horizontal direction.

Figure 9A:
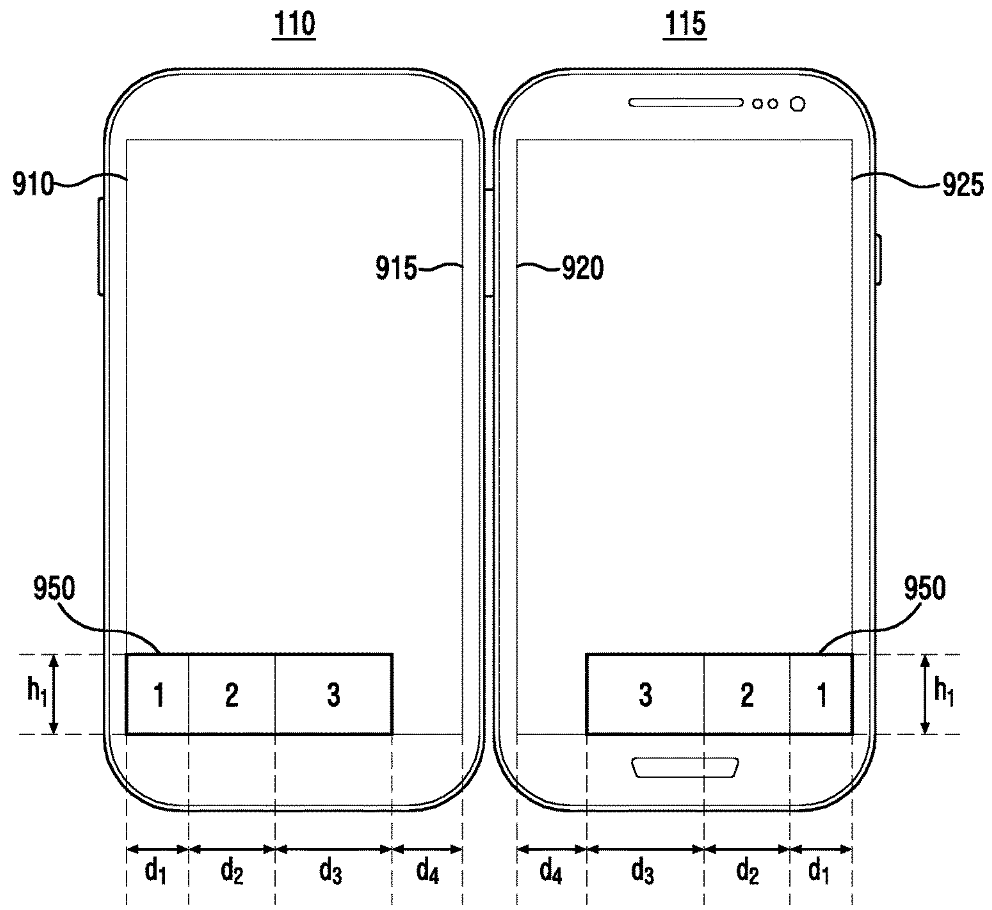
FIGS. 9A, 9B, and 9C illustrate rearranging a second type of control object on a moved screen according to an embodiment of the present disclosure.
Figure 9B:
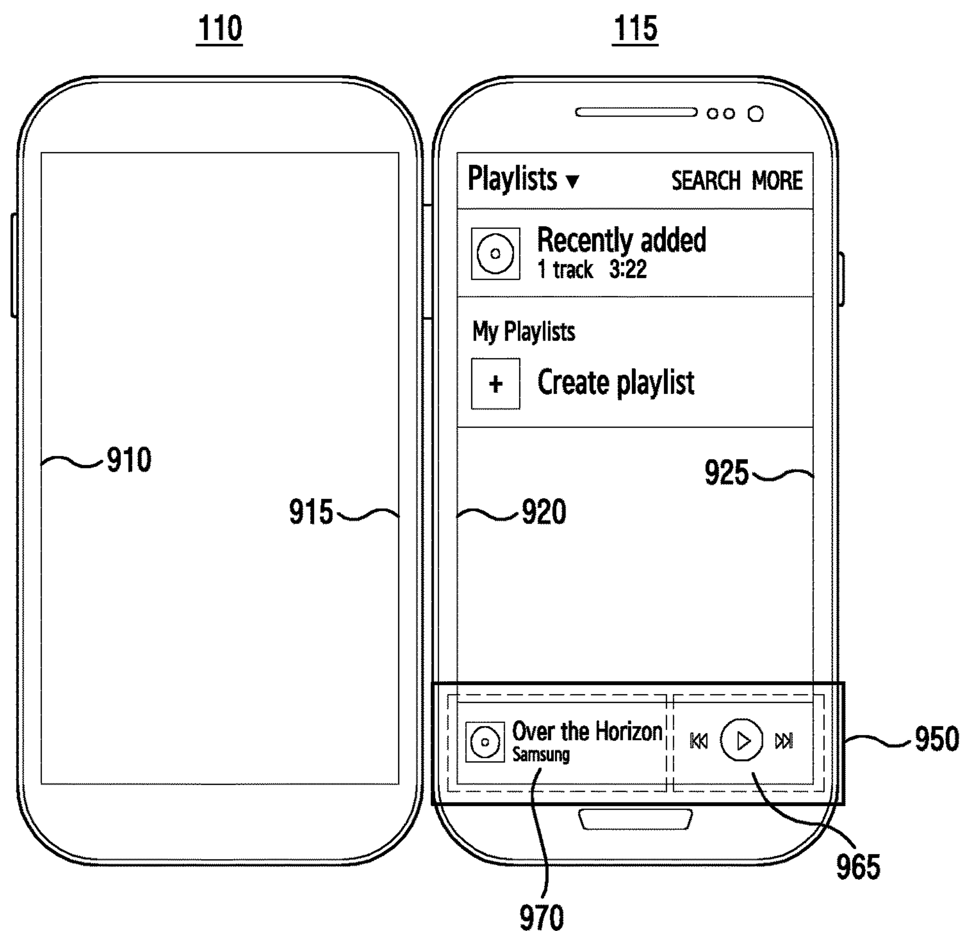
Figure 9C:
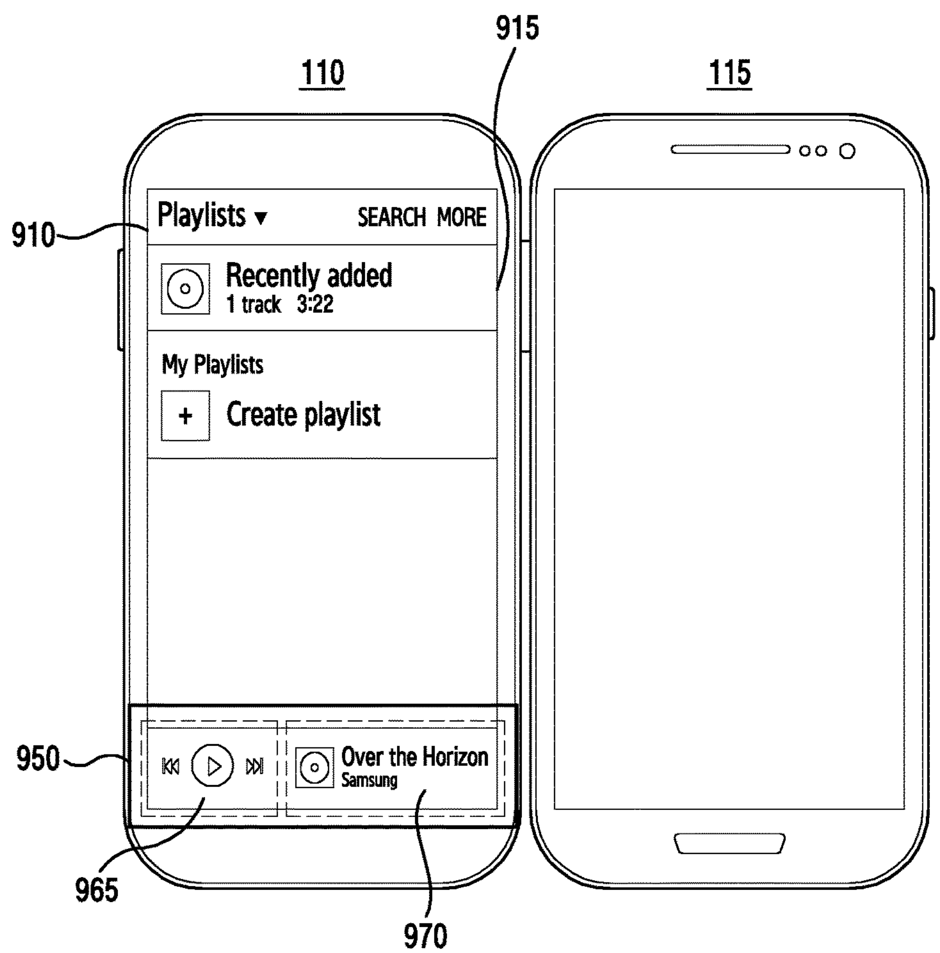

FIGS. 9A, 9B, and 9C illustrate rearranging a second type of control object on a moved screen according to an embodiment of the present disclosure. Specifically, FIGS. 9A, 9B, and 9C illustrate rearranging objects of a horizontal control object group. As described above, a horizontal control object group may include a plurality of control objects that are organized into a group and are connected to each other in the horizontal direction. That is, the horizontal control object group may include at least two objects grouped in a horizontal direction and connected to each other.

Referring to FIG. 9A, a screen including a horizontal control object group 950 is displayed on the first display 110. The horizontal control object group 950 includes three control objects that are grouped in the horizontal direction and is positioned on the first boundary surface 910 of the first display 110 in the horizontal direction. The three control objects of the horizontal control object group 950 have widths of d1, d2, and d3, respectively, in the horizontal direction, and the horizontal control object group 950 is separated from a second boundary surface 915 of the first display 110 by a distance d4.

When rearranging a position of the horizontal control object group 950, based on movement of the screen, the processor 100 may rearrange the position of areas of the horizontal control objects 950 on a screen for movement. For example, the processor 100 may reverse the horizontal position of the horizontal control object group 950, while the vertical position thereof remains the same. In addition, the order of the control objects in the horizontal control object group 950 may also be reversed.

For example, when the screen is moved from the first display 110 to the second display 115 in FIG. 9A, the processor 100 horizontally reverses an area of the horizontal control object group 950, such that it is separated from a first boundary surface 920 of the second display 115 by a distance d4, and while the height thereof remains the same size h1. Additionally, the order of the three control objects are reversed within the rearranged horizontal control object group. In accordance with an embodiment of the present disclosure, the horizontal control object group in FIG. 9A has a margin of size d4, as an example, the horizontal control object group area may not have a margin of size d4.

As described above, an electronic device according to an embodiment of the present disclosure may, when the screen including the horizontal control object group is moved, rearrange the horizontal control object group such that the entire area of the horizontal control object group is reversed in the horizontal direction, while remaining in the same position in the vertical direction. In addition, the control objects within the rearranged horizontal control object group may be rearranged.

FIGS. 9B and 9C illustrate examples of a music player application. Specifically, FIG. 9B illustrates a right side music player application screen displayed on the second display 115, and FIG. 9C illustrates a left music player application screen displayed on the first display 110. In the left and right music play application screens, a horizontal control object group 950 is provided, which includes a play/movement button 965 and a button 970 for checking information on music being played. Here, the play/movement button 965 may be a single control object in which a rewind (REW) button, a play button, and a fast forward (FF) button are configured as a set. Therefore, the play/movement button may be moved as a single object (while the order of the plurality of buttons therein remains the same).

Referring to FIG. 9B, the horizontal control object group 950 spans the entire width of the second display 115, i.e., from a first boundary surface 920 to a second boundary surface 925 in the horizontal direction. In this case, when moved the first display 110, the position of the horizontal control object group remains the same, as illustrated in FIG. 9C. However, while the position of the horizontal control object group 950 is the same in FIGS. 9B and 9C, and the position of control objects 965 and 970 that are included in the horizontal control object group 950 are reversed.

Figure 10A:
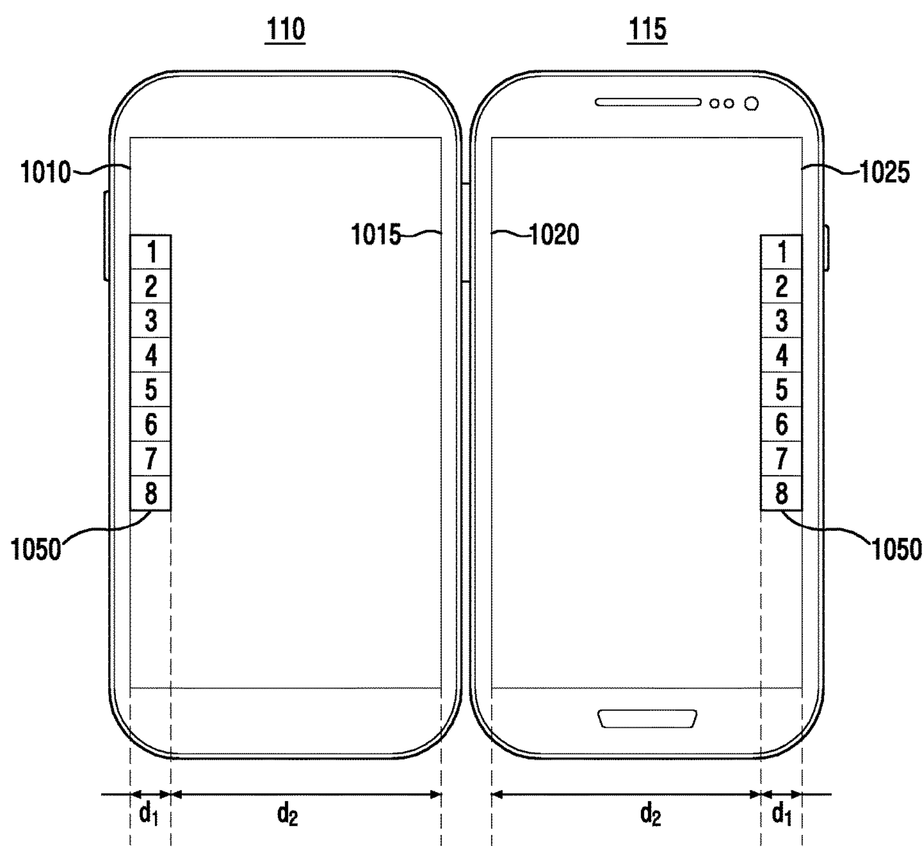
FIGS. 10A, 10B, and 10C illustrate rearranging a third type of control object on a moved screen according to an embodiment of the present disclosure.
Figure 10B:
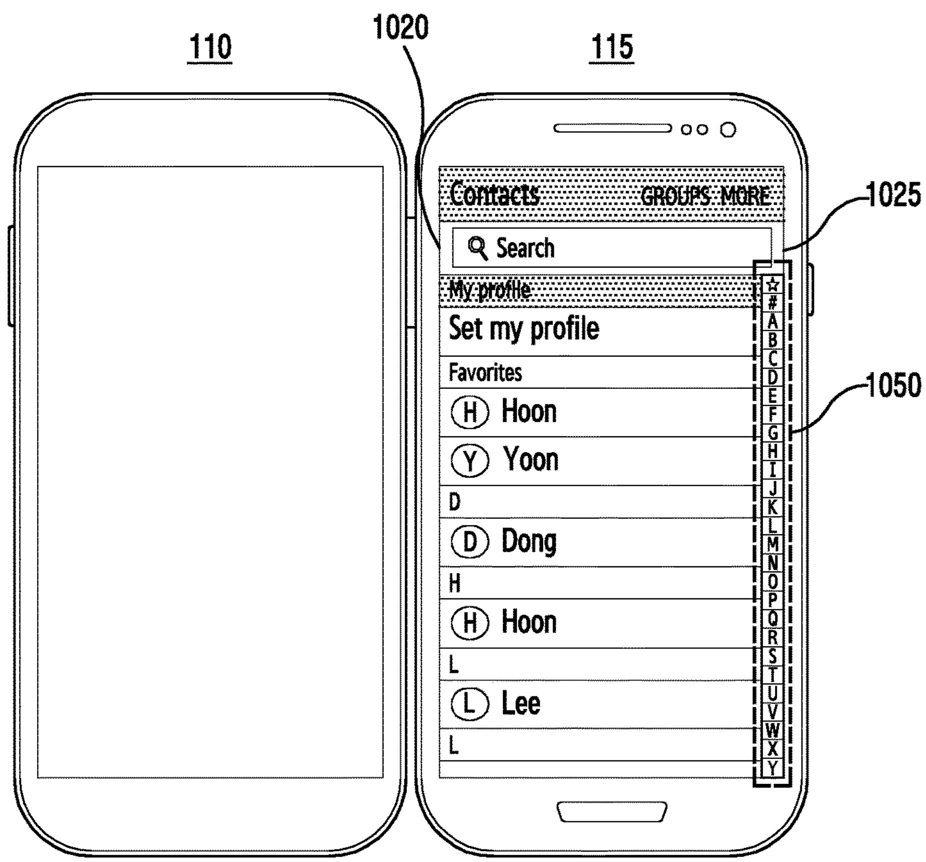
Figure 10C:
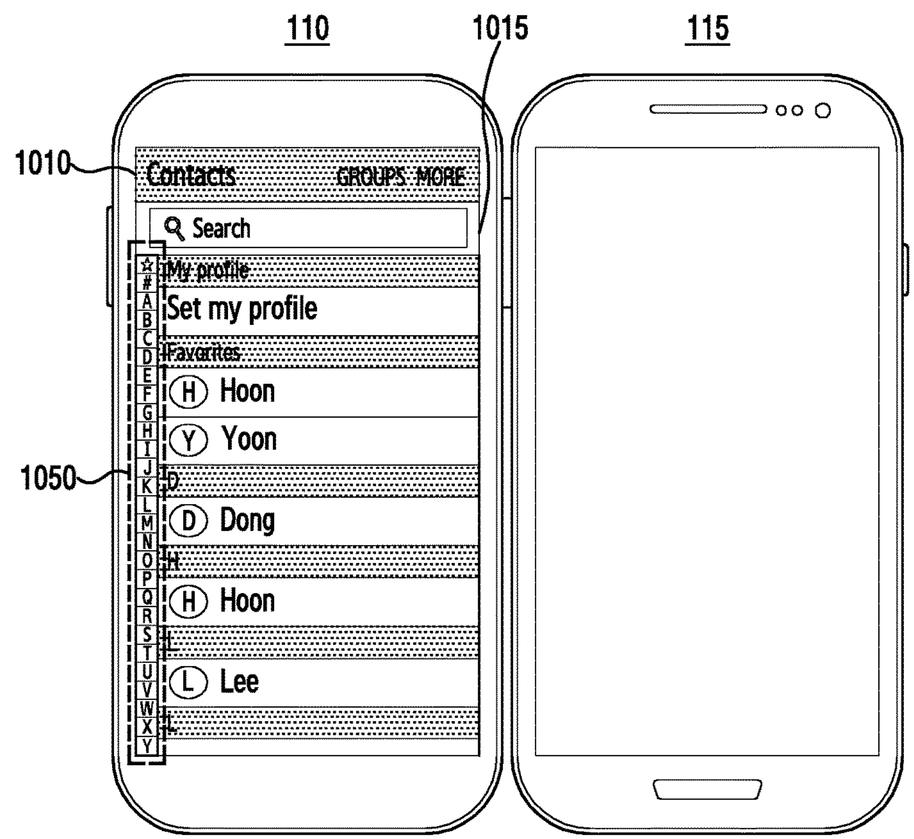

FIGS. 10A, 10B, and 10C illustrate rearranging a third type of control objects on a moved screen according to an embodiment of the present disclosure.

Referring to FIGS. 10A, 1013, and 10C, the third type of control objects is a vertical control object group, in which a plurality of control objects are configured as a group and connected to each other in the vertical direction. That is, in the vertical control object group, at least two single objects are grouped in the vertical direction and connected to each other.

In FIG. 10A, a screen displayed on the first display 110 includes a vertical control object group 1050 in which eight control objects are grouped and positioned, in a vertical direction, at the first boundary surface 1010 of the first display 110. Although FIG. 10A illustrates an example in which the vertical control object group 1050 does not have a margin in the horizontal direction from the first boundary surface 1010, i.e., the vertical control object group 1050 contacts the first boundary surface 1010, alternatively, the vertical control object group 1050 may have a margin of a predetermined size from the first boundary surface 1010.

When rearranging the position of the vertical control object group 1050, based on movement of the screen, the processor 100 may rearrange the position in which the vertical control object group 1050 is displayed within the screen. For example, the horizontal position of the vertical control object group 1050 may be reversed while the vertical position thereof remains the same. In addition, the position of the control objects in the determined vertical control object group 1050 may remain the same.

For example, in FIG. 10A, when moving the screen of the first display 110 to the second display 115, the processor 100 horizontally reverses the position of the vertical control object group 1050 from the first boundary surface 1010 of the first display 115 to a second boundary surface 1025 of the second display, while the vertical position thereof remains the same. In addition, the position of the control objects in the rearranged vertical control object group 1050 remains the same. In accordance with an embodiment of the present disclosure, the area of the vertical control object group does not have a horizontal margin in FIG. 10A, the vertical control group may have the horizontal margin.

In accordance with an embodiment of the present disclosure, the electronic device according to various embodiments of the present disclosure may, when the screen including the vertical control object group moves, rearrange the vertical control object such that the entire area of the vertical control object group is horizontally reversed and the vertical direction remains the same. In addition, the electronic device may maintain the control objects that are located within the entire area of the rearranged vertical control object group.

FIGS. 10B and 10C illustrate an example of a screen of a contact application being moved.

In the contact application screen, a vertical control object group 1050 displays a list of subscribers among a contact list. The vertical control object group 1050 is positioned, in horizontal and vertical directions, without margin, at the second boundary surface 1025 of the second display 115.

When the contact application screen is moved to the first display 110, the processor 100 moves the contact application screen as illustrated in FIG. 10C, such that the vertical control object group 1050 is displayed at the left margin 1010 of the first display 110.

Figure 11A:
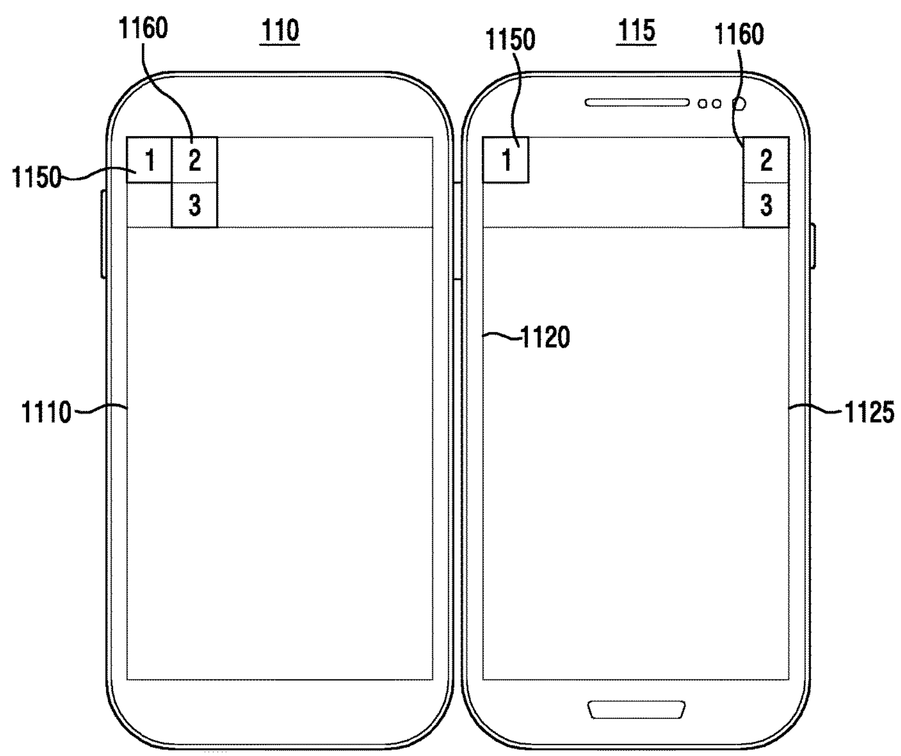
FIGS. 11A, 11B, and 11C illustrate rearranging a fourth type of control object on a moved screen according to an embodiment of the present disclosure.
Figure 11B:
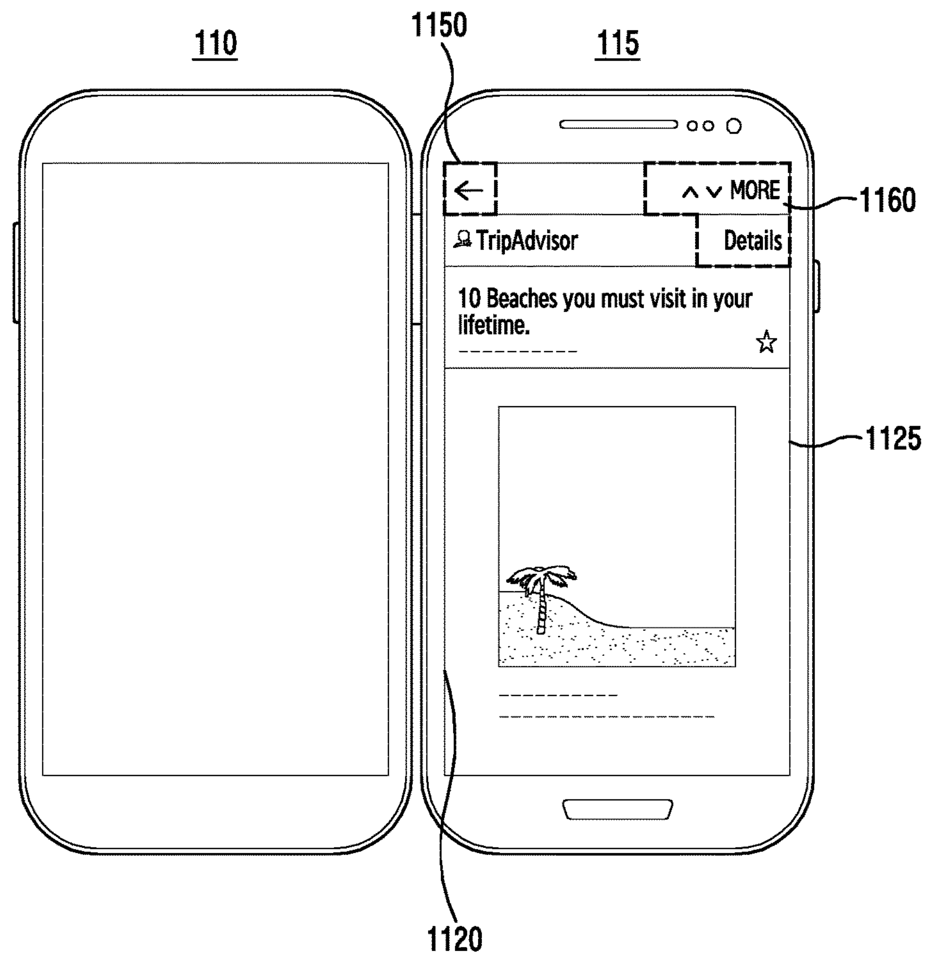
Figure 11C:
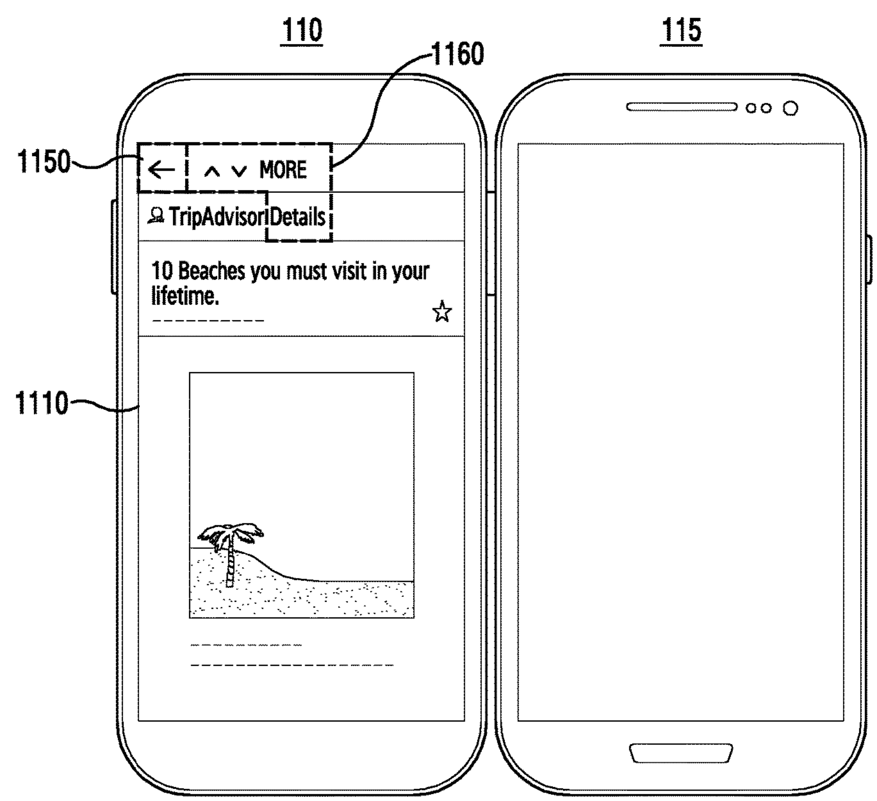

FIGS. 11A, 11B, and 11C illustrate rearranging a fourth type of control objects on a moved screen according to an embodiment of the present disclosure.

Referring to FIGS. 11A, 11B, and 11C, the fourth type of control objects is a complex control object including a fixed control object 1150 and a moveable control object 1160. The complex control object includes a fixed control object 1150, which is displayed at a fixed position, and other control objects 1160 that may be rearranged when the screen moves. In addition, the complex control object may have a form of a single control object, a horizontal control object group, and/or vertical control object group.

In FIG. 11A, a screen displayed on the first display 110 includes a complex control object. The complex control object displayed on the first display 110 includes a fixed control object 1150 and control objects 1160 that may be rearranged. Accordingly, when the screen moves, the fixed control object 1150 remains fixed at a specific position of the screen. In FIG. 11A, the fixed control object is fixed at a specific position adjacent to the first boundary surface 1110 of the first display 110 or the second boundary surface 1120 of the second display 115.

FIG. 11A illustrates an example where the complex control object includes the fixed control object 1150 displayed adjacent to the moveable control objects 1160, when the screen is displayed on the first display 110. When the screen is moved to the second display 115, the moveable control objects 1160 of the complex control object are horizontally reversed and rearranged to the second boundary surface 1125. However, the fixed control object 1150 is displayed at the same position, i.e., the top left corner of the screen. In accordance with an embodiment of the present disclosure, the rearranged control object 1160 is shown in a form of a vertical control object group however, it may have forms of a general control object or horizontal control object group.

In accordance with an embodiment of the present disclosure, the electronic device according to various embodiments of the present disclosure may display, when a screen including a complex control object moves, the fixed control object in a fixed position regardless of the left screen and the right screen and determine a position on which the rearranged control object is rearranged depending on its form.

FIGS. 11B and 11C illustrate an example of an e-mail application screen.

Referring to FIGS. 11B and 11C, the complex control object displayed on the title area of the e-mail application screen includes a back button that is the fixed control object 1150 and a button that is a rearrangeable control object 1160. In accordance with an embodiment of the present disclosure, the back button may be a fixed control object in which a position on which the control object is displayed is fixed, as shown in FIG. 11B and 11C. In addition, other buttons in the title area may be the rearranged control object to be rearranged when the screen moves. When the e-mail application screen is moved to the first display 110, the processor 100 maintains the fixed control object 1150 at a fixed position on the screen, as illustrated in FIG. 11C, while control objects 1160 are rearranged.

In accordance with an embodiment of the present disclosure, when the fixed control object is placed on a position on which the control object is to be rearranged, the rearranged control object may be arranged to be located behind the fixed control object. For example, as illustrated in FIG. 11C, when the screen is displayed in the first display, the fixed control object 1150 remains at the top left corner of the screen, while the rearranged control objects 1160 are rearranged at a position adjacent to the fixed control object 115.

Figure 12A:
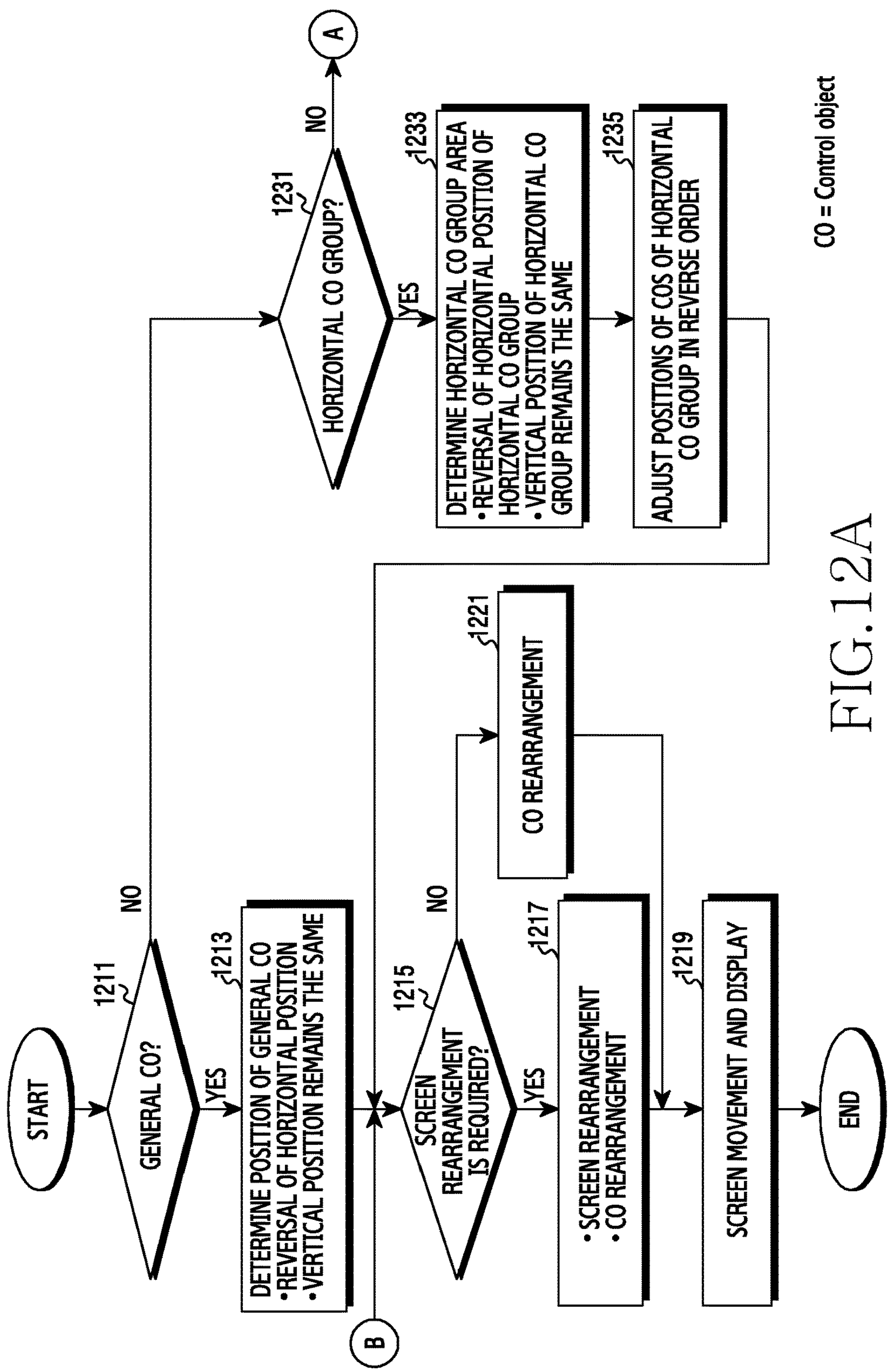
FIGS. 12A and 12B is a flowchart illustrating a method of rearranging a screen in an electronic device according to a type of a control object included in the moved screen according to an embodiment of the present disclosure.
Figure 12B:
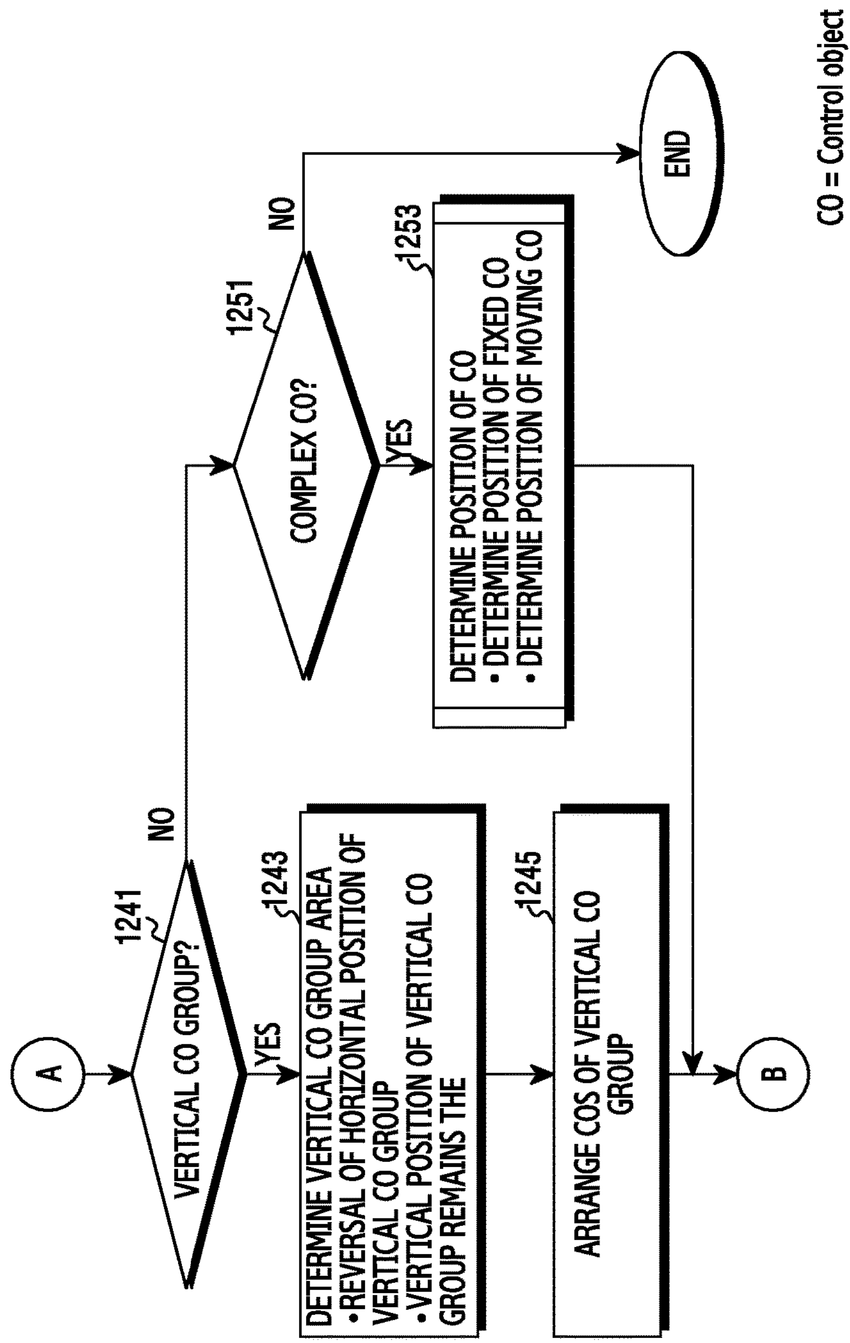

FIGS. 12A and 12B is a flowchart illustrating a method of rearranging, by an electronic device, a screen according to a type of the control object included in the screen, when moved, according to an embodiment of the present disclosure.

Referring to FIGS. 12A and 12B, in step 711 of FIG. 7, when a request for screen movement is made, the processor 100 determines whether a control object included in the screen is a general control object in step 1211. For example, the general control object may be a floating element, a sending element (e.g., sending elements to the far side), etc.

If the processor 100 determines that a general control object is included in the screen in step 1211, the processor 100 determines to rearrange for a display position of the general control object in the moved screen in step 1213. For example, the display position of the general control object may be rearranged such that the horizontal position of the general control object is reversed while the vertical position thereof remains the same, as illustrated in FIGS. 8A, 8B, and 8C.

After determining the rearrange of the position of the general control objects, the processor 100 analyzes whether a rearrangement of the screen is required in step 1215. For example, when only the position of the general control object (e.g., a floating event of a single control object, a horizontal control object group, complex control object in the title area, etc.) is to be arranged, the processor 100 may merely rearrange the position of the general control object. However, when the rearrangement of the screen is required to move according to the rearrangement of the general control object (e.g., a control object, among single control objects, which horizontally moves to the other side, vertical control object group, etc.), the processor 100 may rearrange the position of the general control object and rearrange the screen.

Accordingly, when it is determined that the screen is required to be rearranged in step 1215, the processor 100 rearranges and the general control object and the screen in step 1217, and moves and displays the rearranged screen including the rearranged general control object in step 1219.

However, when it is determined that the screen is not required to be rearranged in step 1215, the processor 100 rearranges only the position of the general control object in step 1221, and moves and displays the including the rearranged general control object in step 1219.

If the processor 100 determines that the control object included in the screen is not the general control object in step 1211, the processor 100 determines whether a horizontal control object group is included in the screen in step 1231.

When the horizontal control object group is included in the screen in step 1231, the processor 100 rearranges a position of the horizontal control object group included in the screen, e.g., as illustrated in FIGS. 9A, 9B, and 9C, in steps 1233 and 1235.

More specifically, when rearranging the horizontal control object group, the processor 100 may reverse the horizontal positioning of the horizontal control object group while the vertical positioning thereof remains the same in step 1233 For example, when the horizontal area has no margin, the processor 100 may keep the horizontal positioning of the horizontal control object group the same. In addition, the processor 100 may reverse the position of the control objects in the horizontal control object group.

In steps 1215 to 1219, the processor 100 moves and displays the screen (possibly being rearranged) including the rearranged horizontal control object group, as already described above.

When the processor 100 determines that a horizontal control object group is not included in the screen in step 1231, the processor 100 determines whether a vertical control object group is included in the screen in step 1241.

When a vertical control object group is included in the screen in step 1241, the processor 100 rearranges the positioning of the vertical control object group, e.g., as illustrated in FIGS. 10A, 10B, and 10C, in step 1243. For example, the processor 100 may reverse the horizontal area of the vertical control object group while keeping the vertical area the same in step 1243.

In step 1245, the processor 100 arranges control objects in the vertical control object group. For example, the processor 100 may reorder the control objects in the vertical control object group. Alternatively, the processor 100 may maintain the order of the control objects in the vertical control object group.

In steps 1215 to 1219, the processor 100 moves and displays the screen (possibly being rearranged) including the rearranged vertical control object group, as already described above.

When the processor 100 determines that a vertical control object group is included in the screen in step 1241, the processor 100 determines whether a complex control object is included in the screen in step 1251.

When a complex control object is included in the screen in step 1251. The processor 100 rearranges a display position of the complex control object included in the screen, e.g., as illustrated in FIGS. 11A, 11B, and 11C, in step 1253.

As described above, when rearranging the complex control object, i.e., the complex control object including a fixed control object and a moveable control object, the position of the fixed control object in the complex control object remains the same, while the positioning of the moveable control object is moved. For example, the moveable control object comprises at least one of the general control object, the horizontal control object group, and/or the vertical control object group. The processor 100 may perform the step 1213 if the moveable control object is the general control object, perform the steps 1233 and 1235 if the moveable control object is the horizontal control object group, and perform the steps 1243 and 1245 if the moveable control object is the vertical control object group.

In steps 1215 to 1219, the processor 100 moves and displays the screen (possibly being rearranged) including the rearranged complex control object, as already described above.

As described above, control objects may be classified as different types, e.g., a general control object, a horizontal control object group, a vertical control object group, and a complex control object. The general control object may include floating elements and sending elements, the horizontal control object group may include an inverting element, the vertical control object group may include swapping elements, and the complex control object may include pushing elements.

Figure 13A:
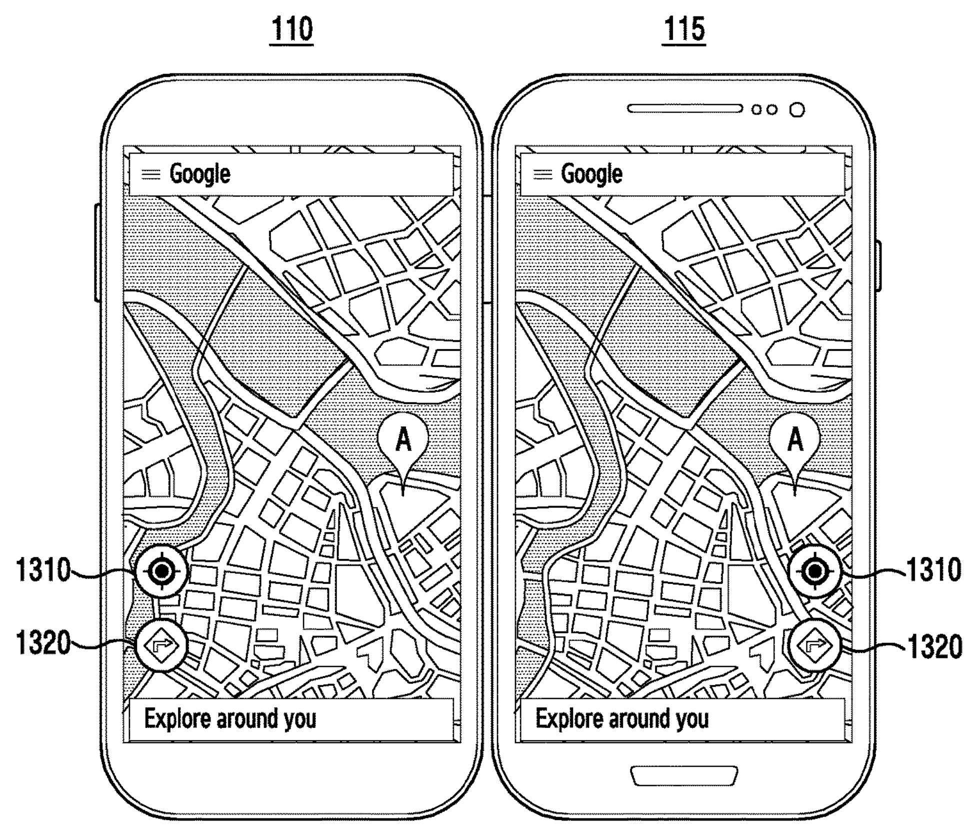
FIGS. 13A, 13B and 13C illustrate examples of rearranging floating elements on a moved screen according to an embodiment of the present disclosure.
Figure 13B:
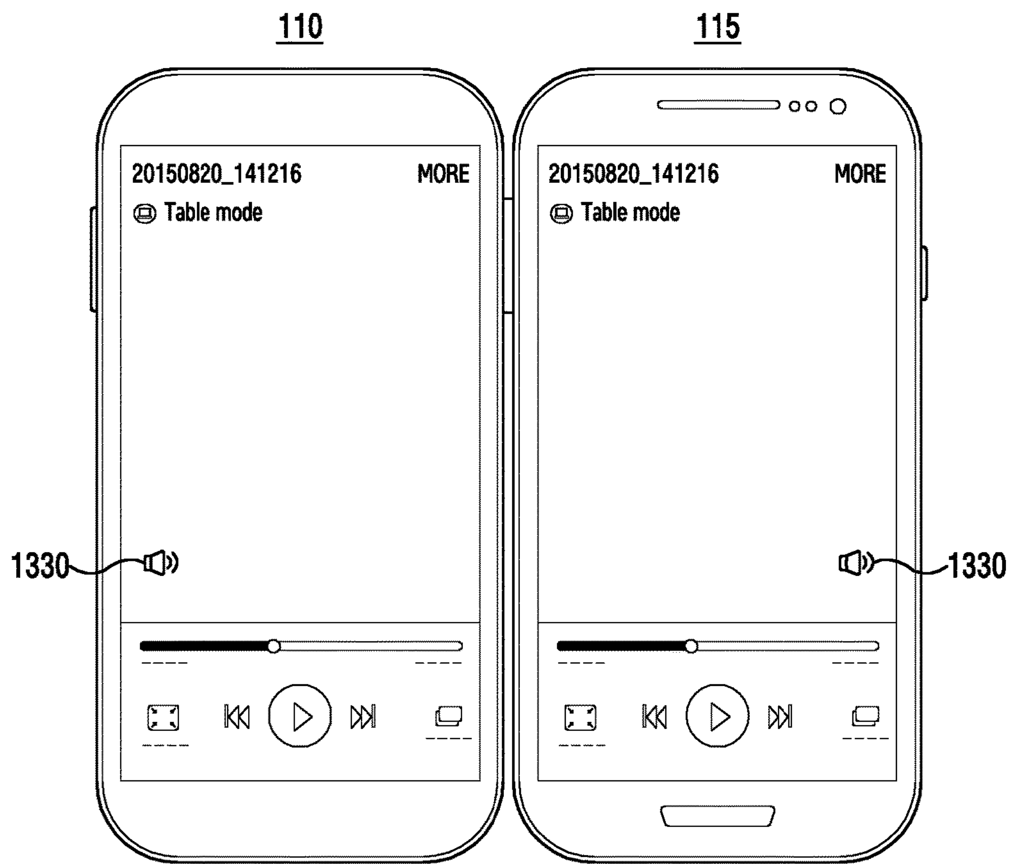
Figure 13C:
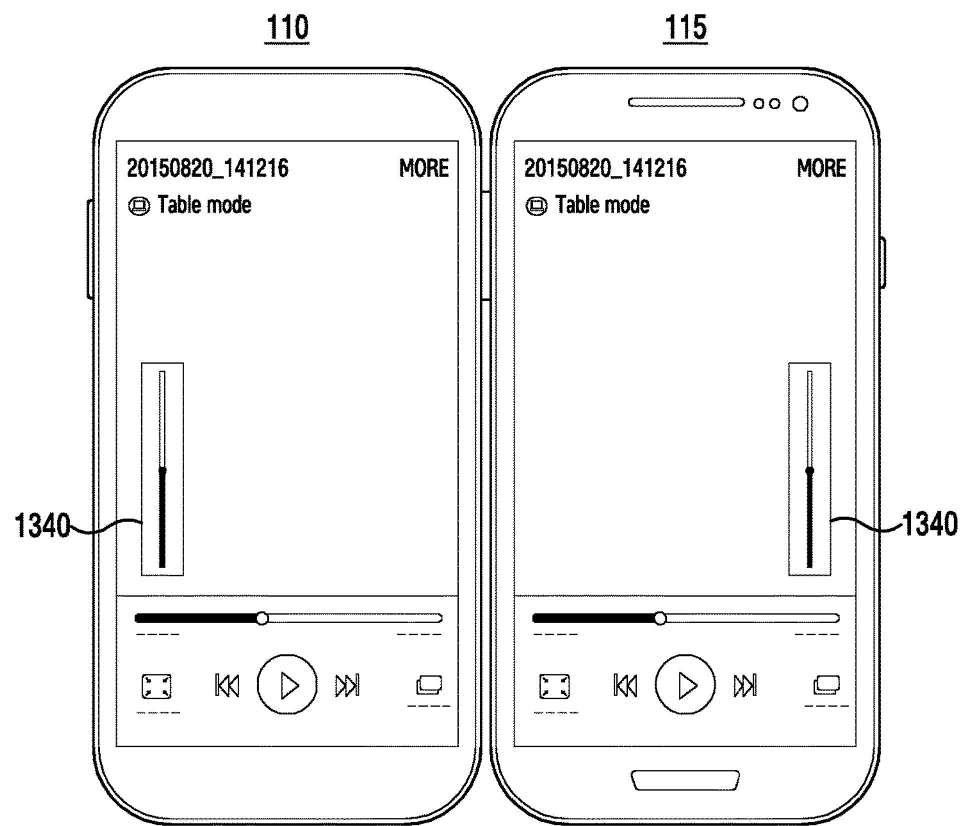

FIGS. 13A, 13B, and 13C illustrate rearranging a floating element on a moved screen according to an embodiment of the present disclosure.

Referring to FIGS. 13A, 13B, and 13C, a layer that displays a screen and a layer that displays a control object may be different from each other. For example, a floating element may be located on a layer above the screen display layer, such that a screen rearranging, e.g., steps 1215 and 1217, will not have to be performed.

FIG. 13A illustrates a screen of a map application, in which control objects 1310 and 1320 are floating elements displayed on a layer above the screen display layer. The control object 1310 is a button for setting a current position of the electronic device, and the control object 1320 is a button for setting a navigation function.

FIGS. 13B and 13C illustrate screens of a video player application. When a control object 1330 of FIG. 13B is touched, a control object 1340 for controlling the volume is displayed, as illustrated in FIG. 13C. Both control object 1330 and control object 1340 are floating elements.

In FIGS. 13A, 13B, and 13C, the floating element control objects 1310 to 1340 are displayed on another layer above the screen display layer.

In addition, when the screens are moved between the first display 110 and the second display 115, the floating element control objects 1310 to 1340 are rearranged such that the horizontal positioning is reversed while the vertical positioning remains the same. For example, when the screen move from the second display 115 to the first display 110, the processor 100 moves the control objects to a position easily reached by a left hand, and when the screens move from the first display 110 to the second display 115, the processor 100 moves the control objects move to a position easily reached by a right hand.

Figure 14:
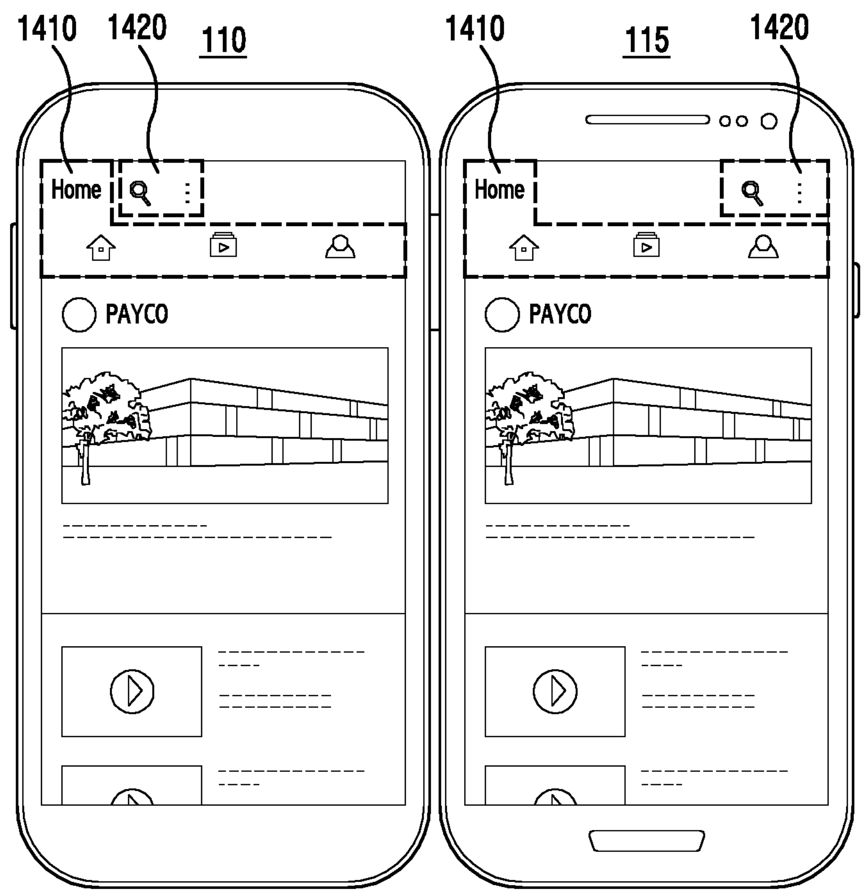
FIG. 14 illustrates rearranging a pushing element on a moved screen according to an embodiment of the present disclosure.

FIG. 14 illustrates rearranging pushing elements in a moved screen according to an embodiment of the present disclosure.

Referring to FIG. 14, the pushing elements (pushing elements to one side) may include control objects for moving (or pushing) some of the pushing elements to the other side. That is, the pushing elements may be complex control objects, and the complex control objects may include a fixed control object that remains in a fixed position regardless of the screen movement and a moveable control object that is rearranged according to the movement of the screen.

Specifically, FIG. 14 illustrates an example of a video player application screen.

Referring to FIG. 14, in the title area the screen, a fixed control object 1410 includes a plurality of buttons, and a moveable control object 1420 also includes a plurality of buttons.

When the screen is moved between the first display 110 and the second display 115, the processor 100 the horizontal position of the moveable control object 1420 is reversed, while the position of the fixed control object remains fixed. The horizontal reversal position of the rearranged control object 1420 may be pushed to the boundary surface of the screen, and when the fixed control object 1410 is located at a position of the boundary surface of the screen, the rearranged control object 1420 may be moved to the position adjacent to the fixed control object.

Figure 15:
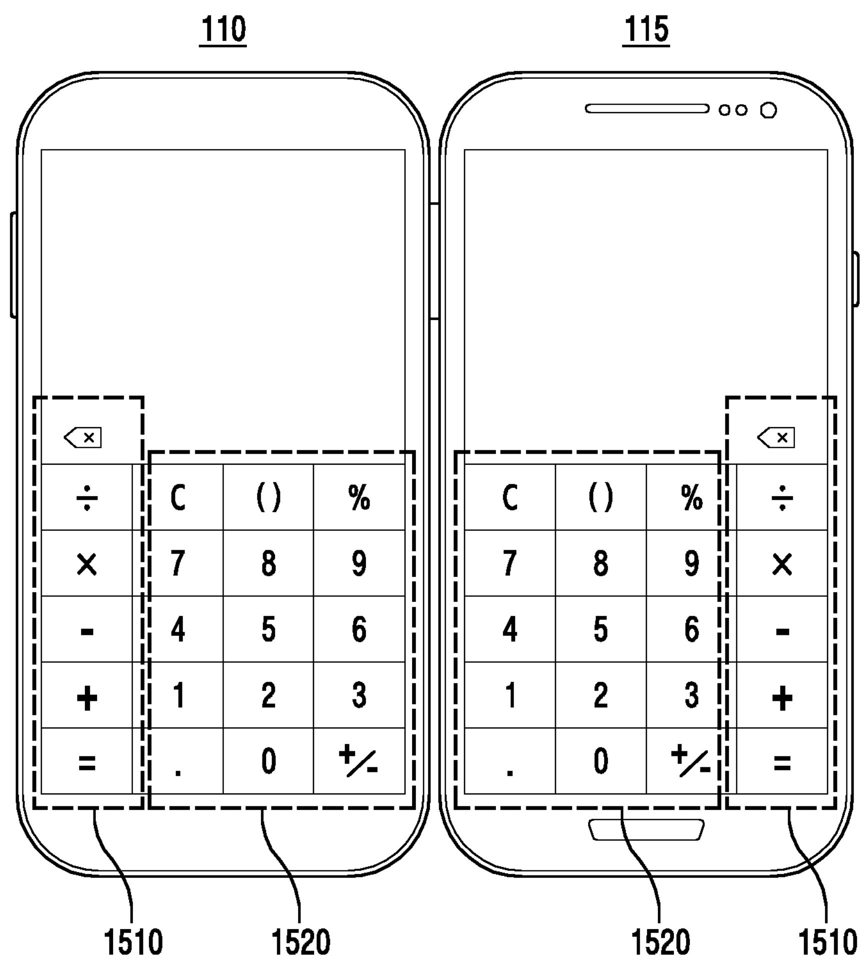
FIG. 15 illustrates rearranging a swapping element on a moved screen according to an embodiment of the present disclosure.

FIG. 15 illustrates rearranging swapping elements on a moved screen for movement.

Referring to FIG. 15, the swapping elements are vertical control object groups. Accordingly, when the screen is moved between the first display 110 and the second display 115, the control objects that are vertically positioned on the left side of the left screen may be rearranged by swapping to the right side on the right screen when the screen moves.

Specifically, FIG. 15 illustrates a calculator application screen. In FIG. 15, operator buttons are included a first vertical control object group 1510, and number buttons are included a second vertical control object group 1520. When the screen is displayed on the second display 115, the operator buttons are vertically arranged on the right side of the screen and the number buttons are vertically arranged on the left side of the screen. In addition, when the screen is moved from the second display 115 to the first display 110, the processor 100 swaps the positions of the vertical control object group 1510 and the second vertical control object group 1520.

Figure 16A:
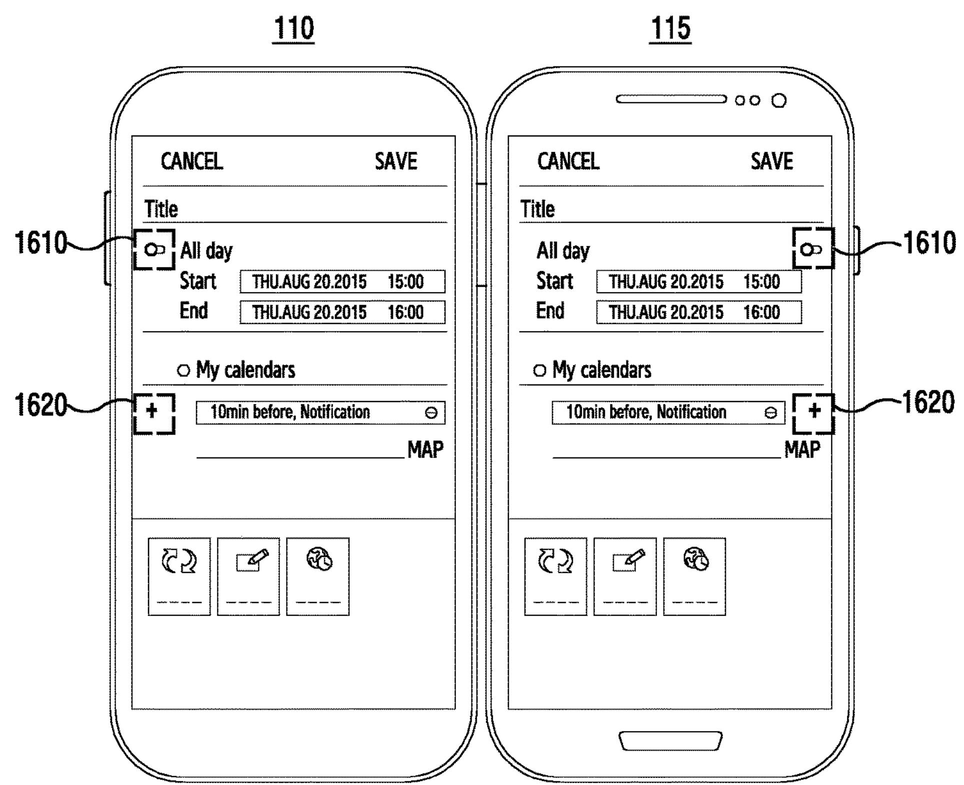
FIGS. 16A and 16B illustrate examples of rearranging a sending element on a moved screen according to an embodiment of the present disclosure.
Figure 16B:
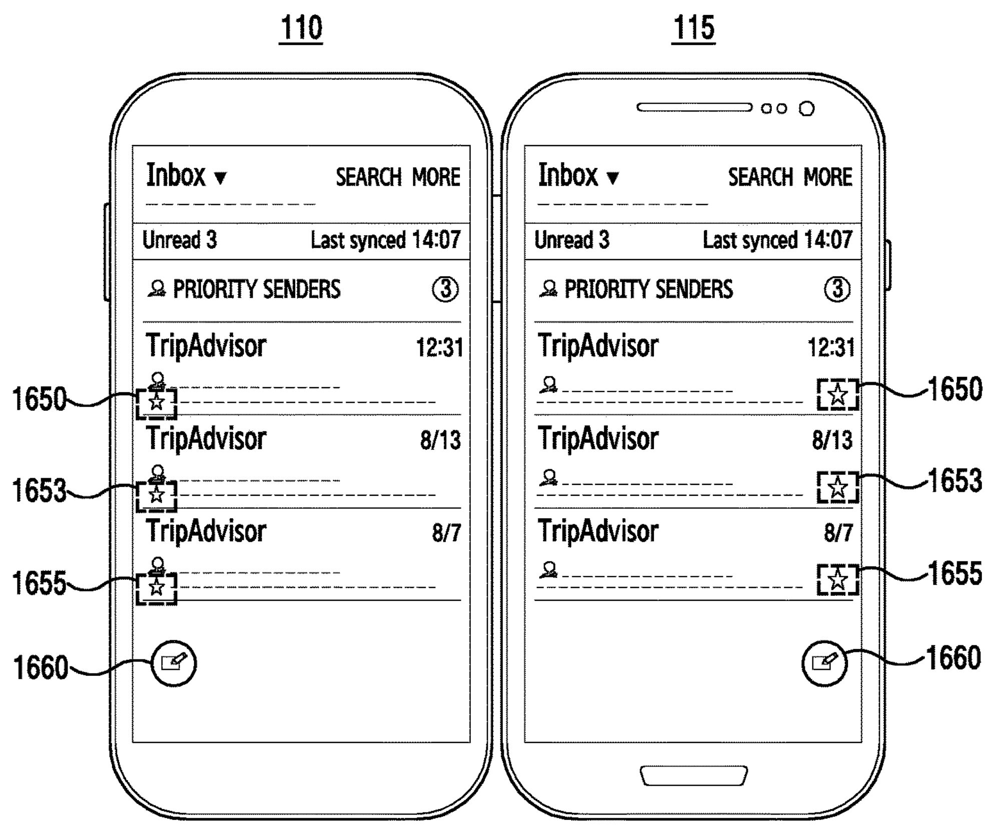

FIGS. 16A and 16B illustrate relocating sending elements on a moved screen according to an embodiment of the present disclosure.

Referring to FIGS. 16A and 16B, the sending elements (elements sending to the far side) may be rearranged by reversing the horizontal position of the control objects located within the screen, when the screen moves. That is, when the screen moves, the processor 100 may rearrange the control objects from one side of a screen to the other. In addition, the sending elements may be located in the same layer as the corresponding item or screen.

Specifically, FIG. 16A illustrates a planner application screen. In FIG. 16A, a control object 1610 is a button for setting start and end time of a planner. When the control object 1610 is 'on', 'all day' may be set, and when the control object 1610 is 'off', the time of the day may be set. In addition, the control object 1620 is a button for generating a notification window. The control objects 1610 and 1620 are buttons for setting functions of corresponding items, and may be disposed on the left side or the right side of the item. For example, the control objects 1610 and 1620 may be arranged on the right-most side of the screen when displayed on the second display 115, and may be arranged on the left-most side of the screen when displayed on the first display 110.

FIG. 16B illustrates an e-mail application screen. In FIG. 16B, the control objects 1650 to 1655 are checkbox buttons for registering the corresponding items as an importance (interest, favorite) item. In addition, a control object 1660 is a create button for creating a new e-mail. The control objects 1650 to 1655 and 1660 are arranged on the right-most side of the screen when displayed on the second display 115, and are arranged on the left-most side of the screen when displayed on the first display 110.

FIG. 17 illustrates rearranging inverting elements on a moved screen according to an embodiment of the present disclosure.

Referring to FIG. 17, inverting elements (inverting order of elements) may set a position of a horizontal control object group when moving the screen, and rearrange control objects therein by their inverting positions of the control objects within the horizontal control object group. That is, the horizontal control object group may be rearranged by reversing the position of the control objects in the horizontal control object group when moving the screen. In addition, when the area of the horizontal control object group has a margin area in the left side and/or right side, the horizontal control object group may be set by reversing the area of the horizontal control object group in the horizontal direction.

Specifically, FIG. 17 illustrates a text message application screen. In FIG. 17, a horizontal control object group 1710 includes three control objects 1721, 1723, and 1725 for creating a text message. The horizontal control object group 1710 spans the entire width of the screen, i.e., the left and right margins are zero.

When the screen is moved, the processor 100 rearranges the control objects 1721, 1723, and 1725 by inverting the horizontal position of the control objects 1721, 1723, and 1725 located within the horizontal control object group 1710. For example, when the screen is displayed on the second display 115, the horizontal control object group 1710 includes the control objects 1721, 1723, and 1725 arranged in the order of 1725, 1723, and 1721, and when the screen is displayed on the first display 110, the horizontal control object group 1710 includes the control objects 1721, 1723, and 1725 rearranged in the order of 1721, 1723, and 1725.

Figure 18:
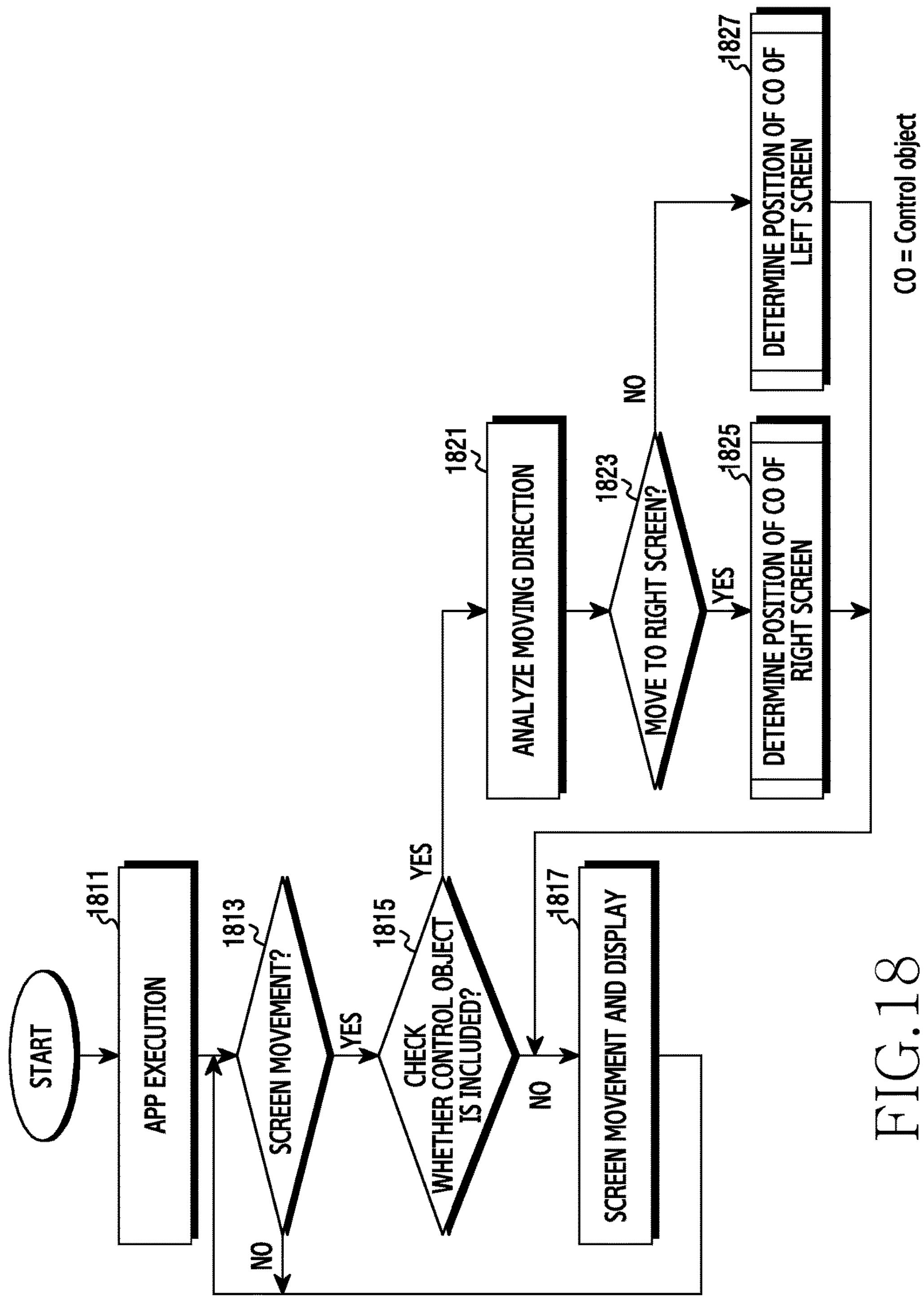
FIG. 18 is a flowchart illustrating a procedure for rearranging a screen of an electronic device during movement, according to an embodiment of the present disclosure.

FIG. 18 is a flowchart illustrating a procedure of rearranging control objects on a screen, by an electronic device, when the screen moves, according to an embodiment of the present disclosure.

Referring to FIG. 18, in step 1811, the processor 100 executes an application and displays, on the first display 110 or the second display 115, a screen of the executed application. The screen displayed on the first display 110 or the second display 115 may include a control object for controlling the operation and function of the corresponding application. The control objects may be a general control object, a horizontal control object group, a vertical control object group, and a complex control object group. The control objects may also be divided into a floating element, a pushing element, a swapping element, a sending element, and an inverting element according to the characteristics of the operation to be rearranged.

When the screen movement is requested (e.g., screen sweep, touch (or multi-touch) and drag, flick, hovering, etc.) in step 1813, the processor 100 may control an input unit corresponding to a display in which an interaction occurs (for example, when the interaction occurs in the first display 110, control the first input unit 120) so that the input unit detects the occurred interaction. When the request for screen movement is recognized, the processor 100 checks whether the screen being displayed includes a control object to be rearranged in step 1815.

When the screen being displayed does not include the control object to be rearranged, the processor 100 moves and displays the screen in step 1817.

When the screen being displayed of the second display 115 moves to the first display 110 and is displayed thereon, the processor 100 may check whether the control object to be rearranged is included in the screen that is displayed on the second display 115, and when there is no control object to be rearranged, the screen may move to and be displayed on the first display 110 without rearranging the screen.

However, when the screen being displayed includes a control object to be rearranged in step 1815, the processor 100 analyzes the movement direction of the screen in step 1821.

When a screen displayed on the first display 110 is moved to the second display 115, the processor 100 recognizes the request as a move to the right screen. In addition, when a screen displayed on the second display 115 is moved to the first display 110, the processor 100 recognizes the request as a move to the left screen.

Based on the analysis in step 1821, the processor determines if the movement of the screen is to the right in step 1823.

When the processor 100 recognizes the request as a move to the right in step 1823, the processor 100 determines a position of the control object in the right screen by rearranging the control object according to the characteristics of the right screen in step 1825, and moves and displays the screen including the rearranged control object on the second display 115 in step 1817.

However, when the processor 100 recognizes the request as a move to the left in step 1823, the processor 100 determines a position of the control object in the left screen by rearranging the control object according to the characteristics of the right screen in step 1827, and moves and displays the screen including the rearranged control object on the first display 110 in step 1817.

Figure 19:
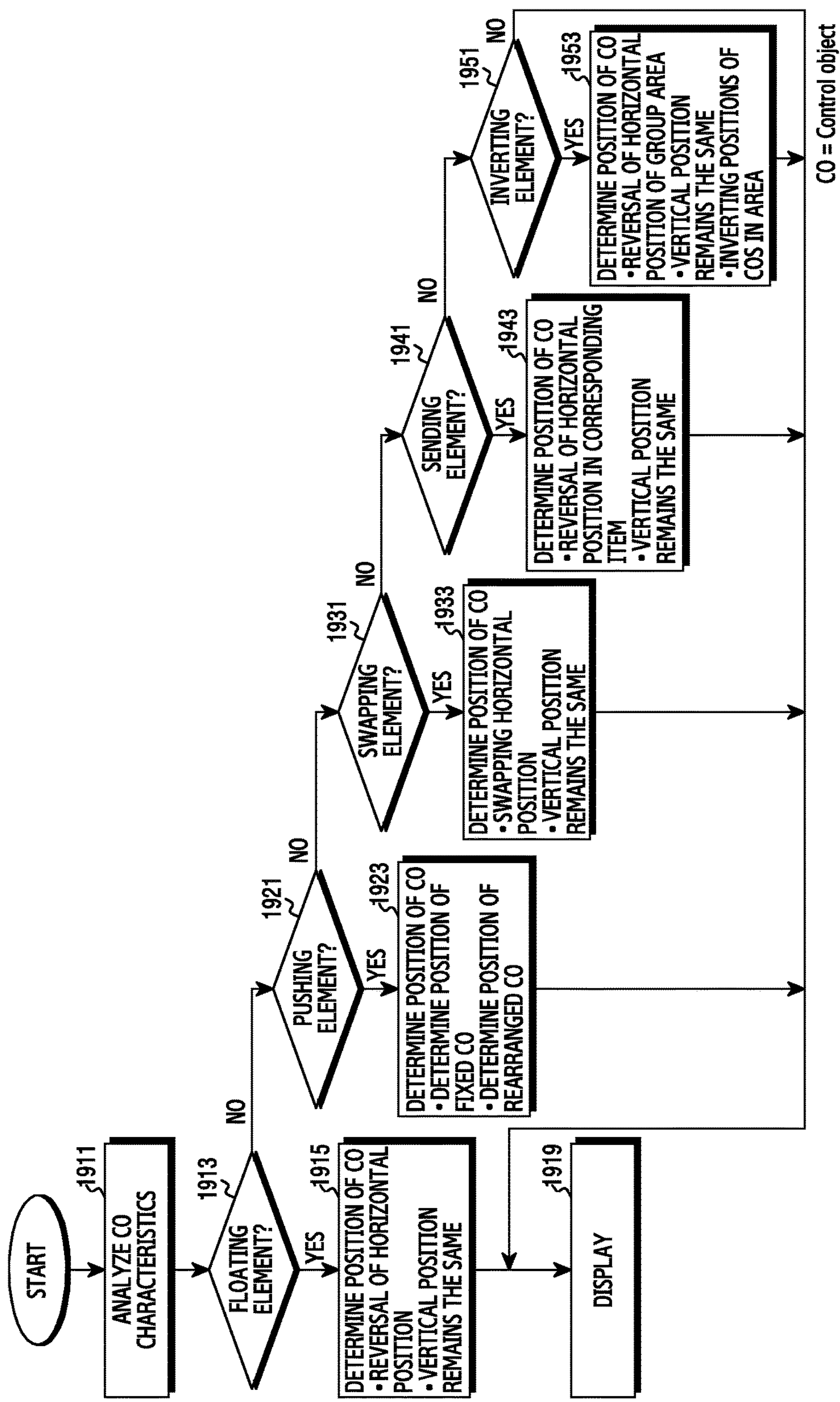
FIG. 19 is a flowchart illustrating a procedure for rearranging a control object on a screen, when the screen is moved, according to an embodiment of the present disclosure.

FIG. 19 is a flowchart illustrating a procedure of rearranging a screen, by an electronic device, when the screen moves, according to an embodiment of the present disclosure.

Referring to FIG. 19, the processor 100 analyzes characteristics of a control object included in a screen to be moved in step 1911. For example, the processor 100 may determine the position for the control object to be rearranged to according to the characteristics of the control object. As described above, the control object may be classified as a floating element, a pushing element, a swapping element, a sending element, and an inverting element according to the characteristics of the control object.

In step 1913, the processor 100 determines if the control object included in the screen is a floating element. The control objects of the floating element may be a control object that is located on a layer different from the screen that is displayed. Therefore, when rearranging of a screen displayed when the screen movement is not required, only the position of the control objects displayed on a layer different from the screen may be rearranged. When the processor 100 determines the control object as a floating element in step 1913, the processor 100 determines the rearrangement position of the control object in step 1915. For example, the processor 100 may reverse the horizontal position of the control object, while the vertical position thereof remains the same. It will be described that an example of moving the screen including the control objects of the floating elements is from the right direction to the left direction. This may be an example where the screen displayed on the second display 115 moves to the first display 100, as in FIGS. 13A, 13B, and 13C.

In step 1919, the processor 100 moves and displays the screen including the rearranged floating element.

When the processor 100 determines that the control object is not a floating element in step 1913, the processor 100 determines if the control object is a pushing element in step 1921. The control objects of the pushing element may include a complex control object including a control object in which the position is fixed and a control object to be rearranged. The fixed control object may be a title bar area and a button having a main function (for example, back key, logo, etc.).

When the processor 100 recognizes the control object as a pushing elements in step 1921, the processor 100 determine the rearrangement position of the control object in step 1923. The processor 100 may not change the display position of the fixed control object, among control objects of the pushing element, and the rearranged control object may be arranged by pushing to the side of a screen for movement. Here, when the fixed control object is located on the side of a screen for movement, the processor 100 may arrange the rearranged control object by pushing to a position to be accessed by the fixed control object (Refer to FIG. 14).

When the processor 100 determines that the control object is not a pushing element in step 1921, the processor 100 determines if the control object is a swapping element in step 1931.

When the processor 100 recognizes that the control object is a swapping element in step 1931, the rearrangement position of the control object is determined in step 1933. When the control objects of swapping elements are rearranged, the processor 100 may control such that the control object is reversed in left-right directions and the vertical direction remains the same. In addition, the screen and control objects may be swapped with each other. For example, the control objects on the screen and the other screens may be swapped with each other and then displayed on a screen for movement (Refer to FIG. 15).

When the processor 100 determines that the control object is not a swapping element in step 1931, the processor 100 determines if the control object is a sending element in step 1941.

When the processor 100 recognizes the control object as a sending element in step 1941, the rearrangement position of the control object is determined in step 1943. When the control objects of sending elements are rearranged, the processor 100 may control such that the control object is reversed in left-right directions and the vertical direction remains the same. Here, the right and left reversal of the horizontal position may be a position having the furthest distance (far side position) from the screen that is currently displayed. For example, on the left screen, the control objects of the sending elements are located on the left-side, and on the right screen, the control objects of the sending elements are located on the right-side. Accordingly, when the screen moves, the control objects of the sending elements may be rearranged on a position having the furthest distance (far side) from the current position (for example, from the left side of the left screen to the right side of the right screen or from the right side of the right screen to left side of the left screen) (Refer to FIG. 16).

When the processor 100 determines that the control object is not a sending element in step 1941, the processor 100 determines if the control object is an inverting element in step 1951.

When the processor 100 recognizes the control object as an inverting element in step 1951, the rearrangement position of the control object is determined in step Fifth, control objects included in a screen for movement may be control objects of the inverting elements. The plurality of control objects of the inverting elements may be arranged on a horizontal control object group area in a horizontal direction. Here, when the screen moves, the control objects of the horizontal control object group may be rearranged by reversing the order of the control objects thereof. In addition, when the horizontal control object group area has a margin, it may be arranged such that the margin area includes the screen information (Refer to FIG. 17).

As described above, in an electronic device having a plurality of displays, when a screen moves, a controlled object included in the screen may be rearranged to have optimum accessibility. For example, when the screen moves from right to left, the control object of the left screen may be automatically rearranged for ease of handling thereof by a user's left hand.

Although examples of a plurality of displays have been described above, an electronic device which can display screens by setting a plurality of display areas (for example, a tablet, a laptop computer, etc.) and an electronic device having a flexible display may perform the same operation described above.

According to various embodiments of the present disclosure, a method for displaying a screen of an electronic device may include: displaying, on a display including a first display area and a second display area, a screen of an application being executed; analyzing the type of a control object when a request for a screen movement between the display areas is made, the screen including the control object therein; rearranging the control object based on the display area in the movement direction; and displaying, on a display area for movement, a screen on which the control object is rearranged.

Here, the first display area may be an area that is located on the left hand side, and the second display area may be an area that is located on the right hand side.

In addition, the rearranging of the control object may include: when the control object included in the screen is a general control object, the processor may rearrange the control object in a display area for movement such that the horizontal position of the control object is reversed and the vertical position thereof remains the same. The general control object may be a control object of a floating element which is displayed on a layer different from the screen display layer. The general control object may be displayed on the same layer as the screen, and rearranging of the control object may include: reversing the horizontal positions of the general control object so as to rearrange the same on the left side of the left screen or the right side of the right screen.

In addition, the rearranging of the control object may include: when the control object displayed on the screen is a horizontal control object group in which a plurality of control objects are horizontally connected to each other, rearranging the control objects in a display area for movement such that the sequence of the control objects in the horizontal group area are inverted and the vertical position thereof remains the same.

In addition, the rearranging of the control object may include: when the control object displayed on the screen is a vertical control object group in which a plurality of control objects are vertically connected to each other, rearranging the control objects in a display area for movement such that the horizontal position of the vertical control object group is reversed and the vertical position thereof remains the same. Wherein rearranging of the vertical control object group may include: swapping screen information and control objects, which configure the screen, and rearrange the same.

In addition, the rearranging of the control objects may include: when the control object displayed on the screen is a complex control object including a fixed control object and an rearranged control object, arranging the fixed control object in a fixed position in a display area for movement, and rearranging the rearranged control object in a position opposite to the direction of the display area for movement. In addition, the rearranging of the complex control object may further include: arranging the control object to be adjacent to the fixed control object when the control object is located at a position where the control object to be rearranged is placed.

An electronic device according to the various above-described embodiments of the present disclosure may display a screen on a plurality of display areas, and when moving the screen between the display areas, the electronic device may rearrange the control objects included within the screen. For example, the electronic device may rearrange the control objects on a screen in consideration of the user's accessibility (for example, right hand or left hand). Accordingly, when the screen moves between displays having dual display areas or between display areas, an electronic device including a dual display may rearrange a controller object to fit the left/right screen situation. For example, when the app moves to the left screen, the electronic device may automatically rearrange a controller object to be easily operated by a left hand, thereby improving the accessibility and usability on the left screen to be the same as that of a right hand when the screen is displayed on the right screen.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising: a first display area; a second display area; and a processor configured to display an application screen including at least one control object on the first display area, detect an input to move the application screen from the first display area to the second display area, identify at least one object to be rearranged on the second display area among the at least one control object, rearrange the identified at least one object on the application screen, based on a type of the identified at least one object and a movement direction of the application screen, and display the application screen including the rearranged at least one object and at least one other object among the at least one control object on the second display area;

wherein a type of the at least one other object among the at least one control object is a fixed control object, and the processor is further configured to maintain the at least one other object in a fixed position.

2. The electronic device of claim 1, further comprising a dual display including a first display and a second display, wherein the first display includes the first display area and the second display includes the second display area.

3. The electronic device of claim 1, wherein, when the type of the identified at least one object is a general control object, the processor is further configured to rearrange the identified at least one object such that a horizontal position of the control object is reversed while a vertical position of the identified at least one object remains the same.

4. The electronic device of claim 3, wherein the identified at least one object is displayed as a floating element on a layer different from a screen display layer when the type of the identified at least one object is the general control object.

5. The electronic device of claim 3, wherein the identified at least one object is displayed on a same layer as the application screen when the type of the identified at least one object is the general control object, and wherein the processor is configured to reverse the horizontal position of the identified at least one object so as to rearrange the same to a left side of a left screen or a right side of a right screen.

6. The electronic device of claim 1, wherein, when the type of the identified at least one object is a horizontal control object group including a plurality of control objects horizontally connected to each other, the processor is further configured to rearrange the identified at least one object by inverting an order of the identified at least one objects, while a vertical position of the identified at least one objects remains the same.

7. The electronic device of claim 1, wherein, when the type of the identified at least one object is a vertical control object group including a plurality of control objects vertically connected to each other, the processor is further configured to rearrange the identified at least one object such that a horizontal position of the identified at least one object is reversed while a vertical position of the identified at least one object remains the same.

8. The electronic device of claim 7, wherein, when the identified at least one object is rearranged, the processor is further configured to swap the identified at least one object with a user interface except the identified at least one object displayed on the application screen.

9. The electronic device of claim 1, further comprising a flexible display that bends along an axis to create the first display area on a first side of the axis and to create the second display area on a second side of the axis.

10. A method for displaying a screen of an electronic device, the method comprising:

displaying an application screen including at least one control object on a first display area;

detecting an input to move the application screen from the first display area to a second display area;

identify at least one object to be rearranged on the second display area among the at least one control object;

rearranging the identified at least one object on the application screen, based on a type of the identified at least one object and a movement direction of the application screen; and displaying the application screen including the rearranged identified at least one object and at least one other object among the at least one control object on the second display area;

maintaining the at least one other object in a fixed position, wherein a type of the at least one other object among the at least one control object is a fixed control object.

11. The method of claim 10, wherein the electronic device includes a dual display including a first display and a second display, and wherein the first display includes the first display area and the second display includes the second display area.

12. The method of claim 11, wherein rearranging the identified at least one object comprises:

when the type of the identified at least one object is a general control object, rearranging the identified at least one object such that a horizontal position of the identified at least one object is reversed while the vertical position of the identified at least one object remains the same.

13. The method of claim 12, wherein the identified at least one object is displayed as a floating element displayed on a layer different from a screen display layer when the type of the identified at least one object is the general control object.

14. The method of claim 12, wherein the identified at least one object is displayed on a same layer as the application screen when the type of the identified at least one object is the general control object, and the rearranging of identified at least one object comprises:

reversing the horizontal position of the identified at least one object so as to rearrange the identified at least one object on the left side of a left screen or the right side of a right screen.

15. The method of claim 11, wherein rearranging the identified at least one object comprises:

when the type of the identified at least one object is a horizontal control object group including a plurality of control objects horizontally connected to each other, rearranging the identified at least one object by inverting an order of the identified at least one object, while a vertical position of the identified at least one object remains the same.

16. The method of claim 11, wherein rearranging the identified at least one object comprises:

when the type of the identified at least one object is a vertical control object group including a plurality of control objects vertically connected to each other, rearranging the identified at least one object group such that a horizontal position of the identified at least one object group is reversed while a vertical position of the identified at least one object remains the same.

17. The method of claim 16, wherein rearranging the identified at least one further comprises swapping the identified at least one object with a user interface except the identified at least one object displayed on the application screen.

18. The method of claim 10, wherein rearranging the identified at least one object comprises arranging the identified at least one object to be adjacent to the at least one other object among the at least one control object.

* * * * *